Figure 22:
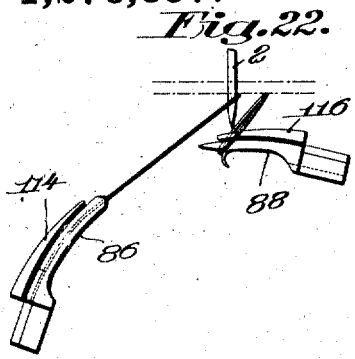

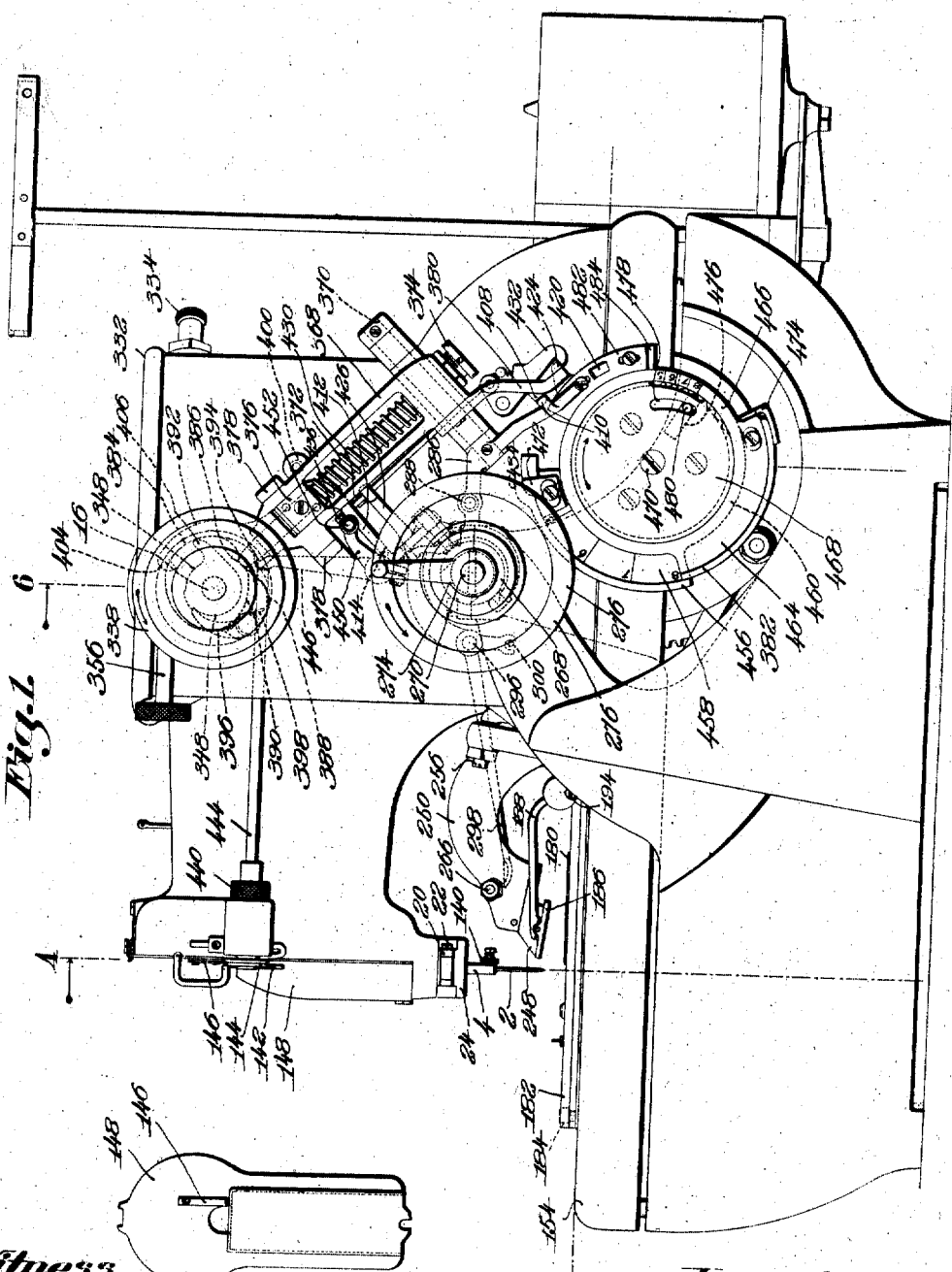

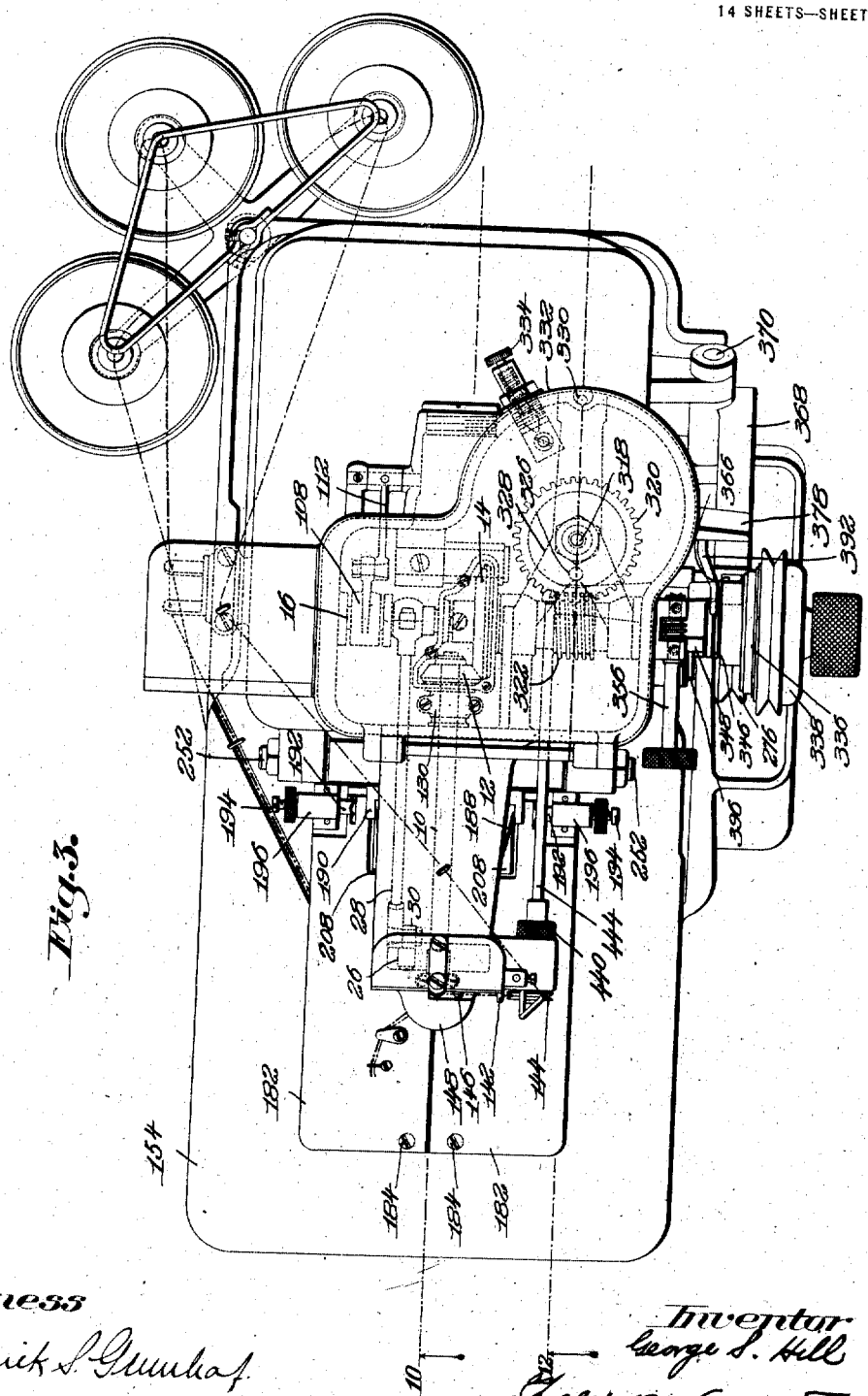

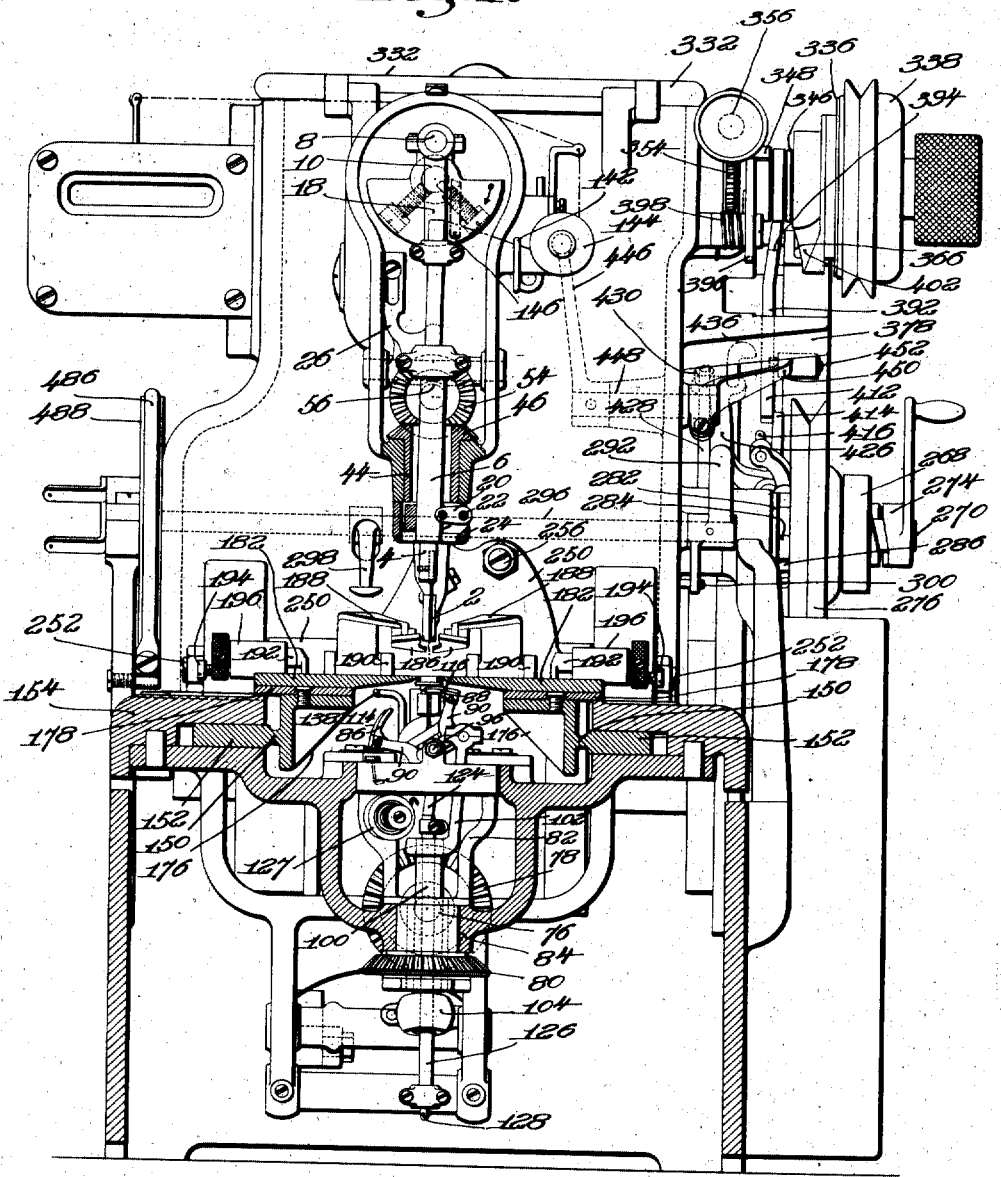

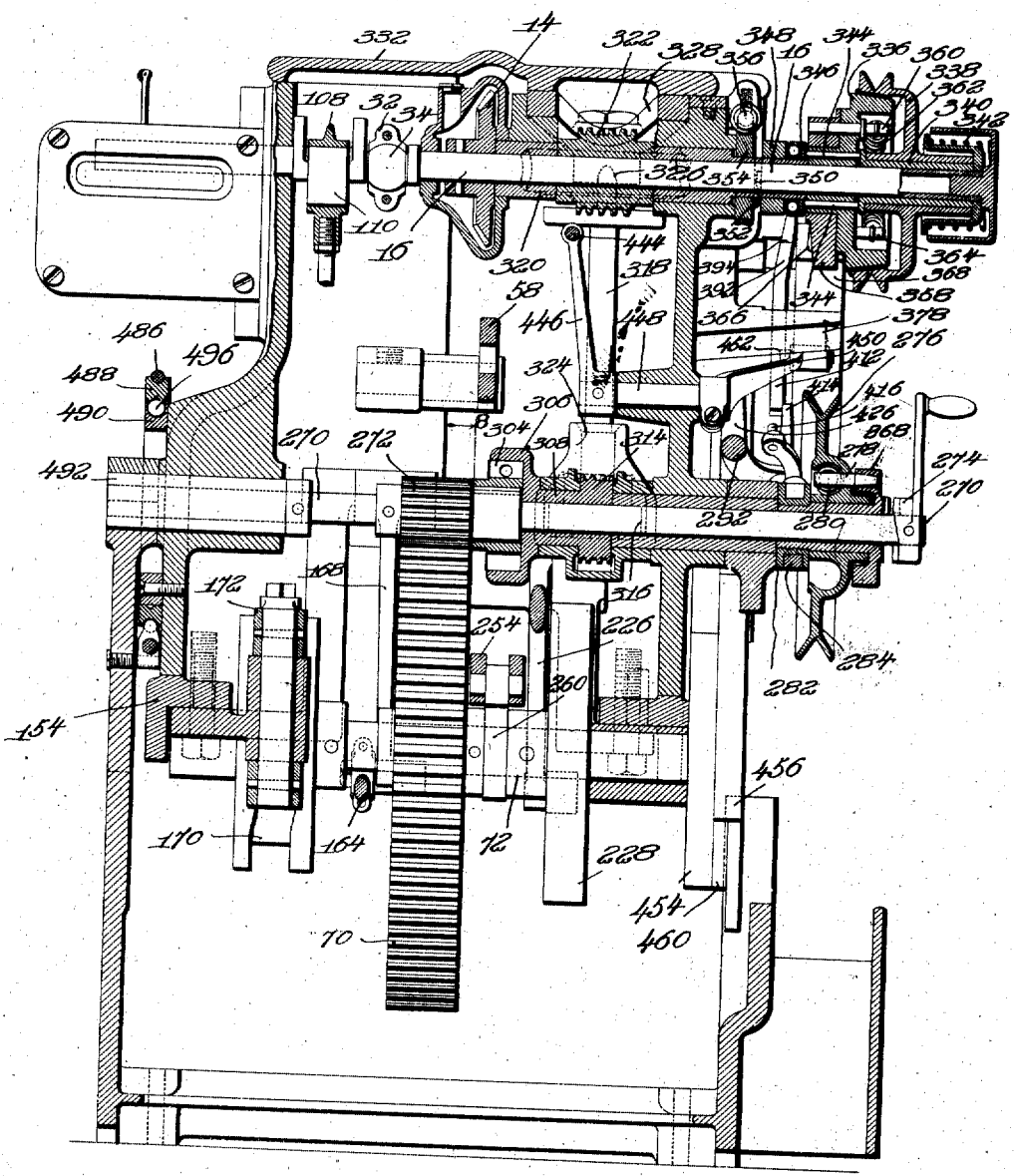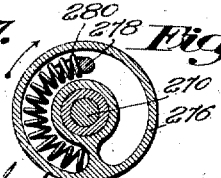

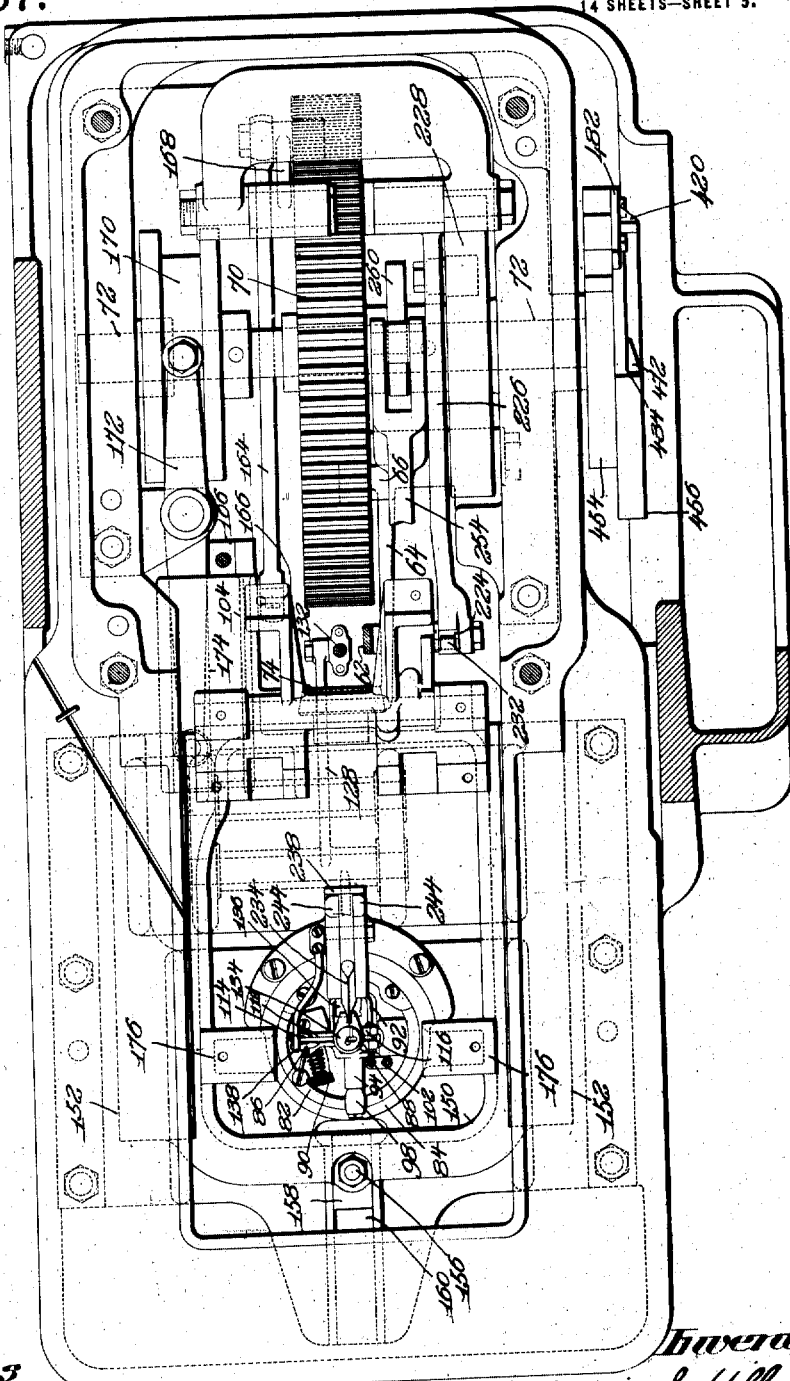

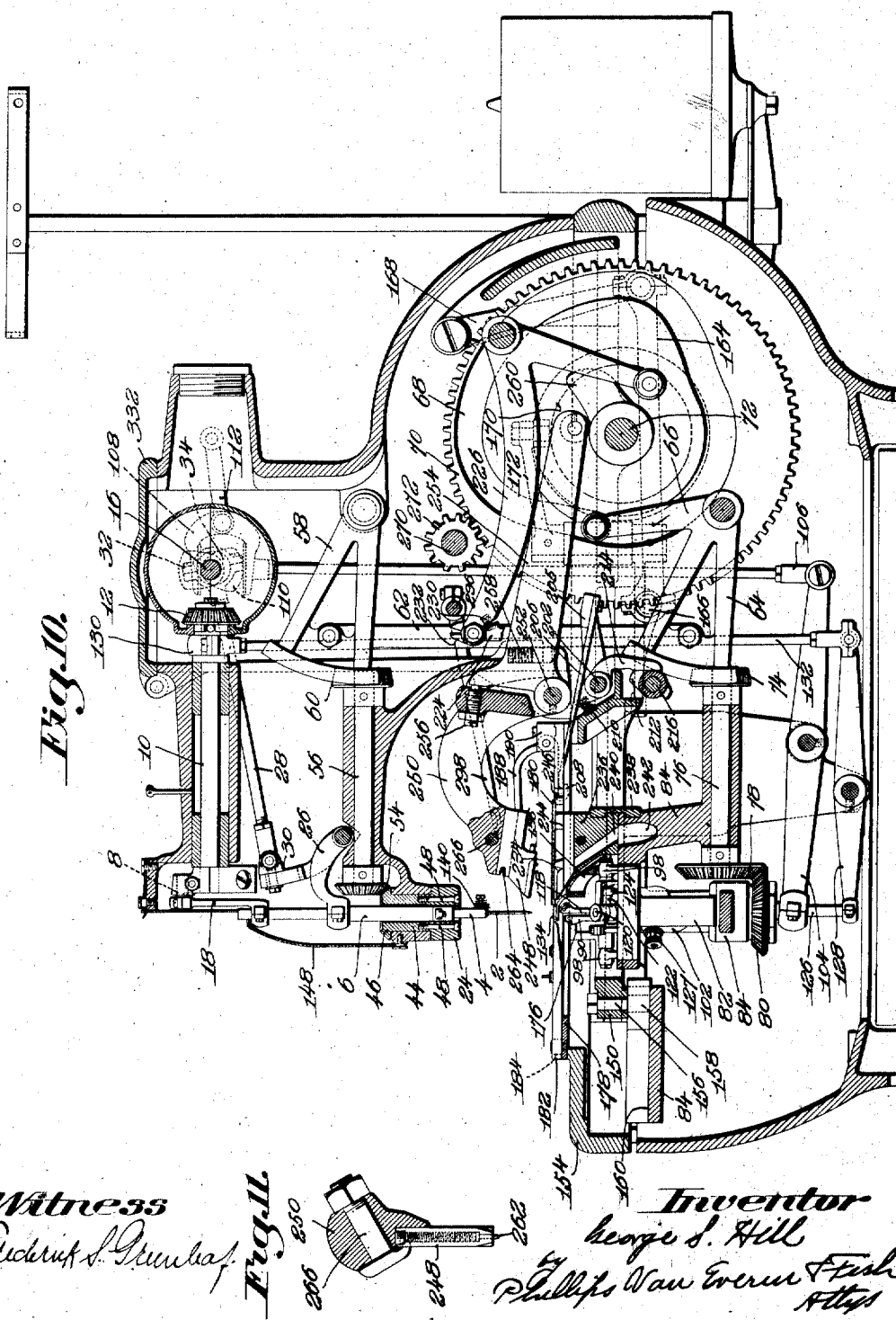

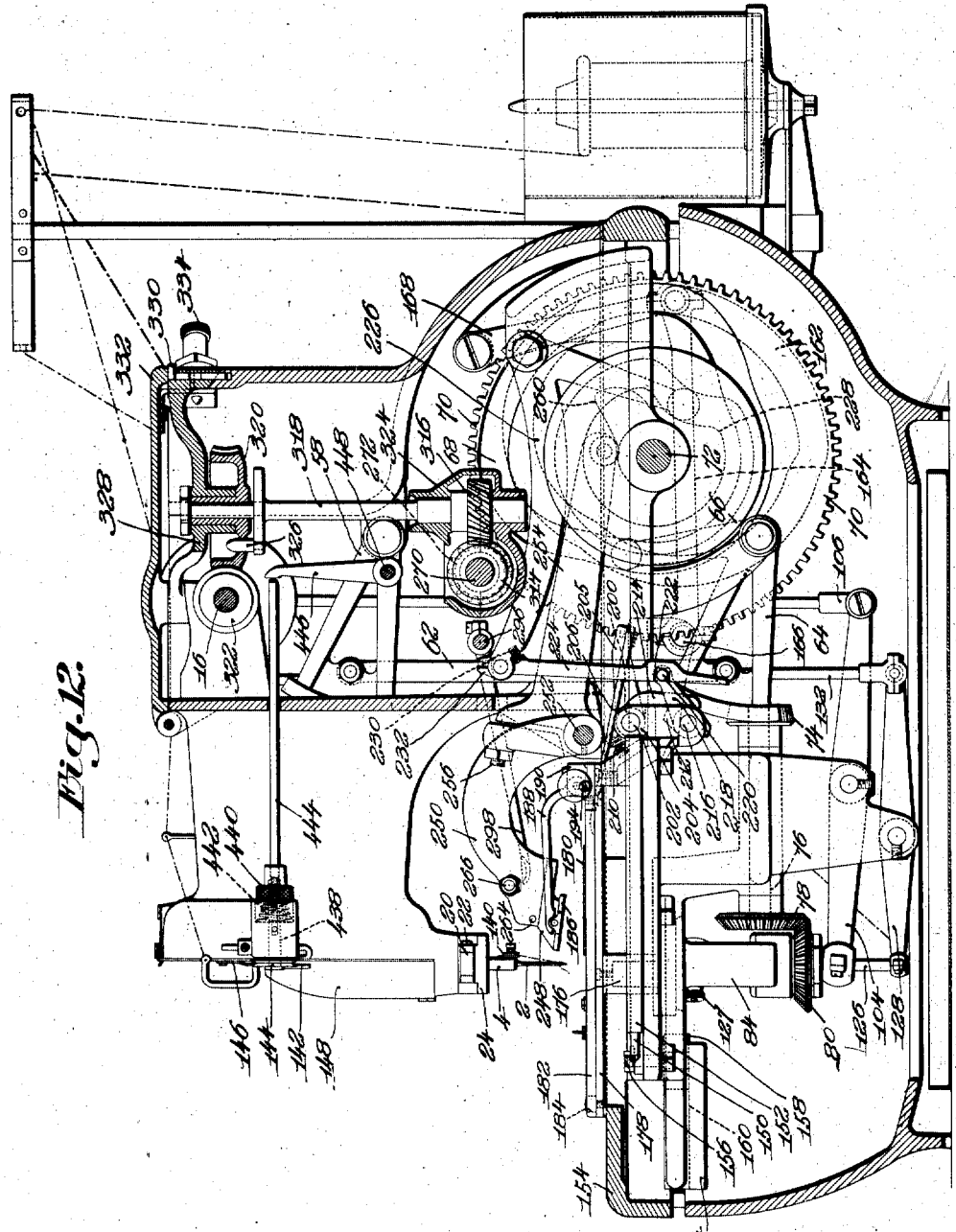

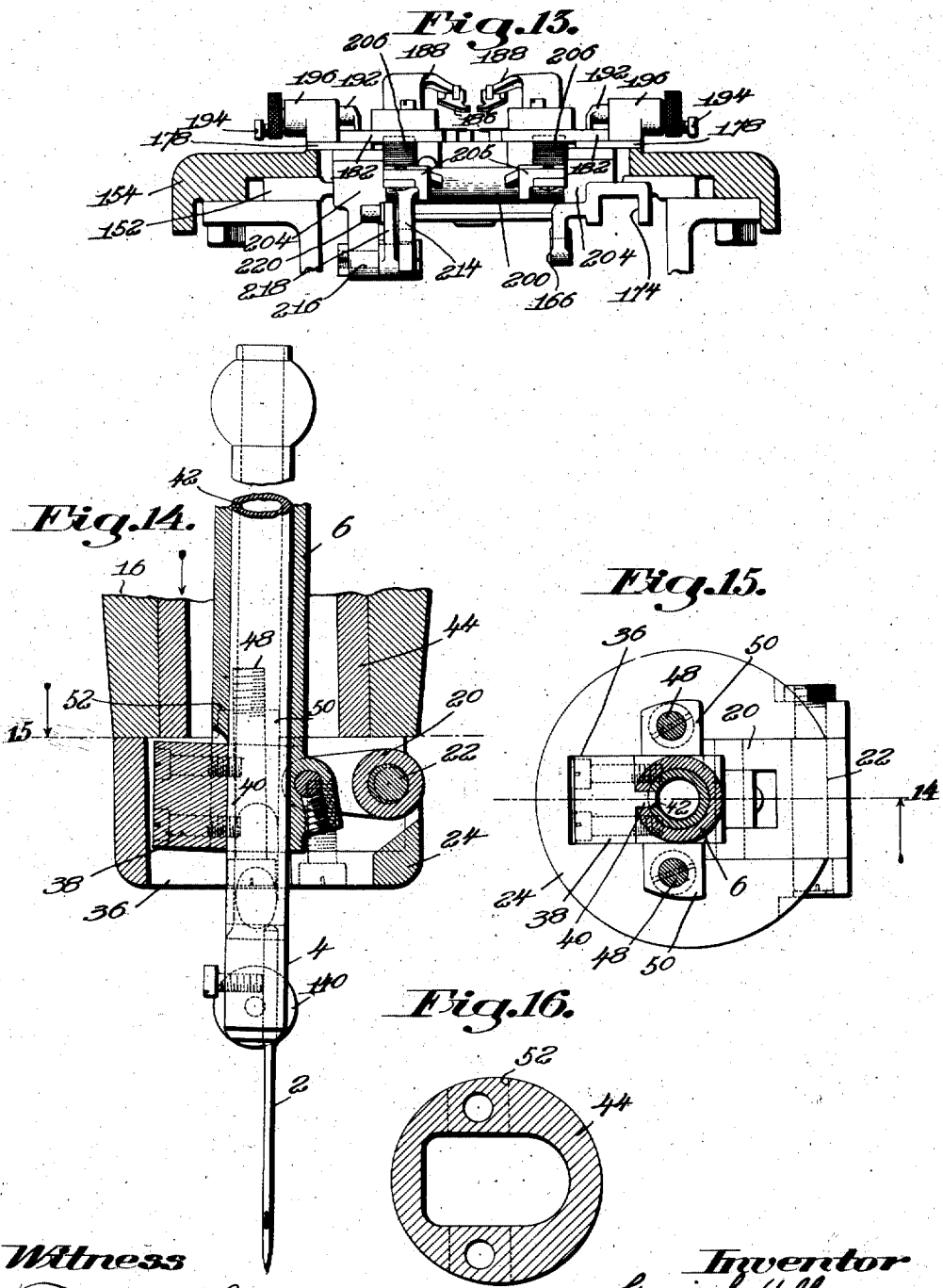

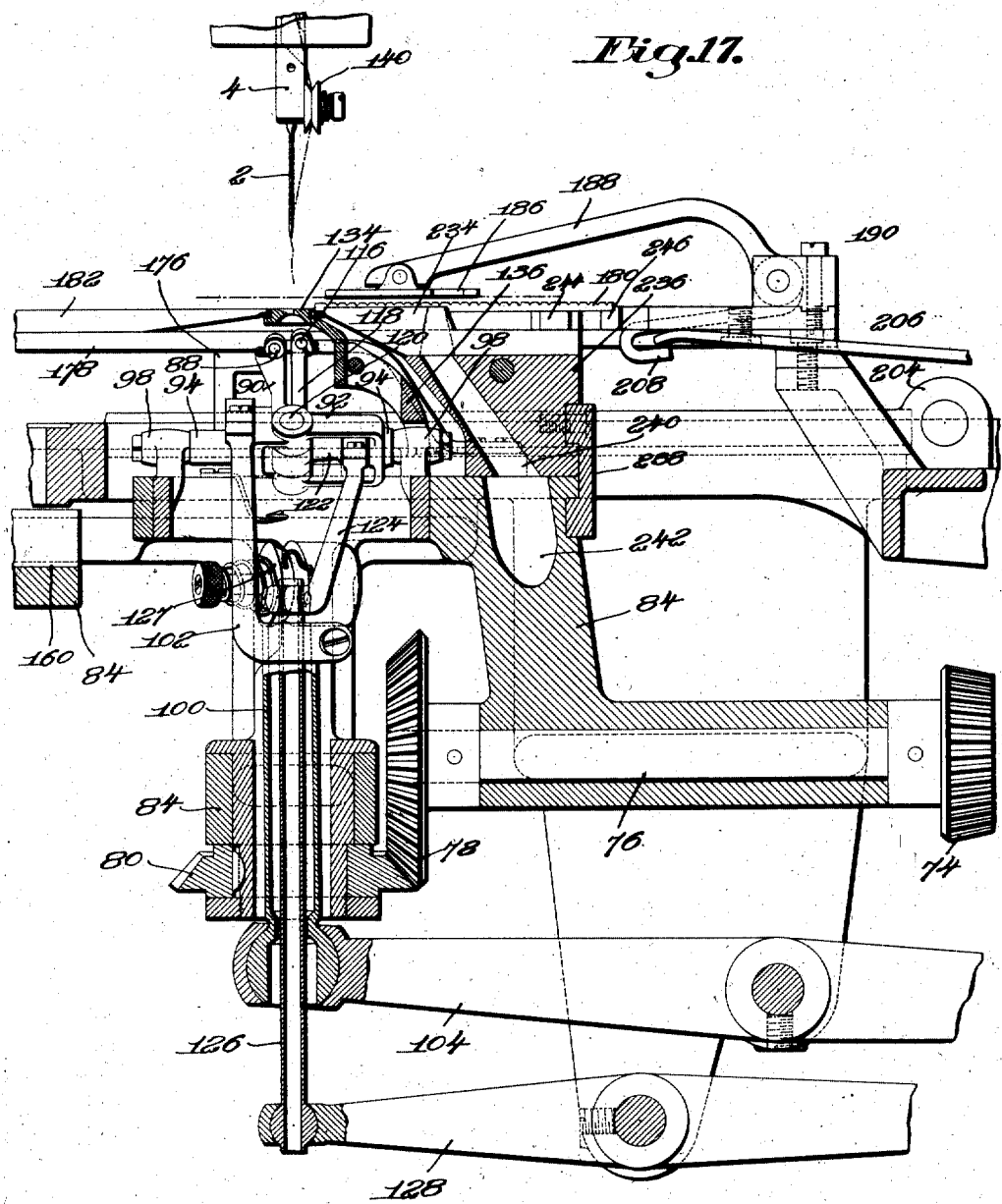

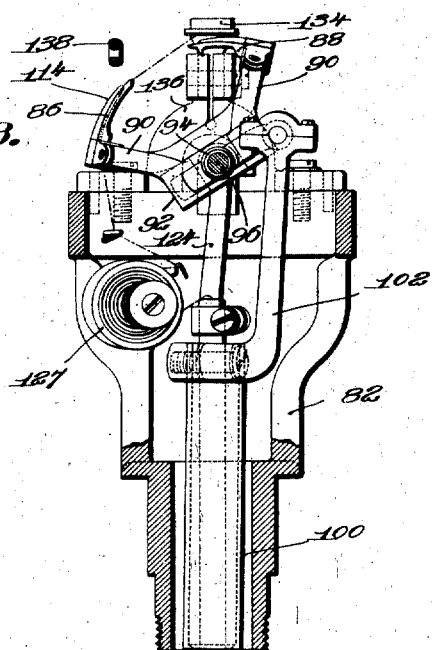
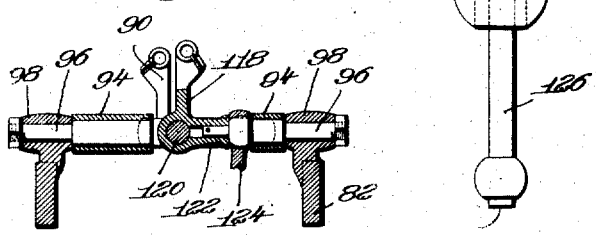
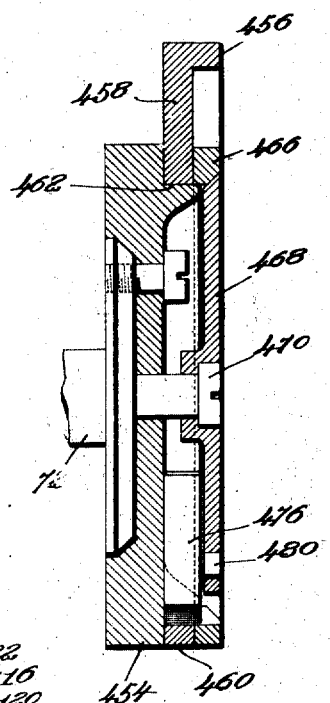
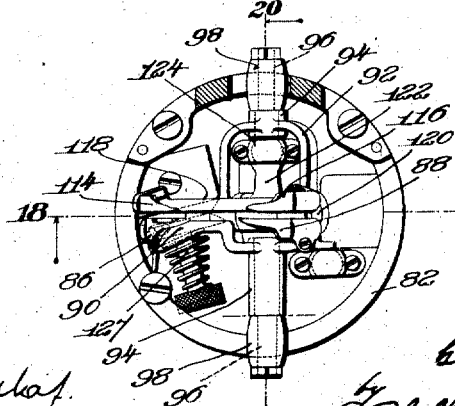

G. S. HILL.
SEWING MACHINE.
APPLICATION FILED JUNE 19, 1916.

1,276,357.

Patented Aug. 20, 1918.
14 SHEETS—SHEET 11.

Witness
Frederick S. Gumbas

Inventor
George S. Hill
by Phillips Van Orden & Fish
Attys.

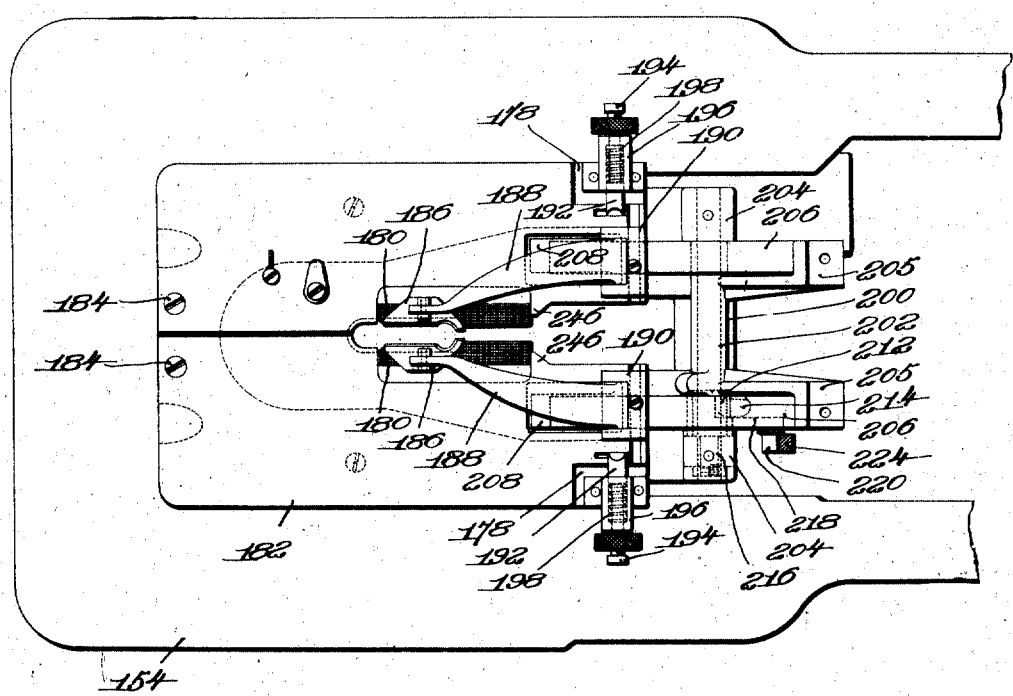
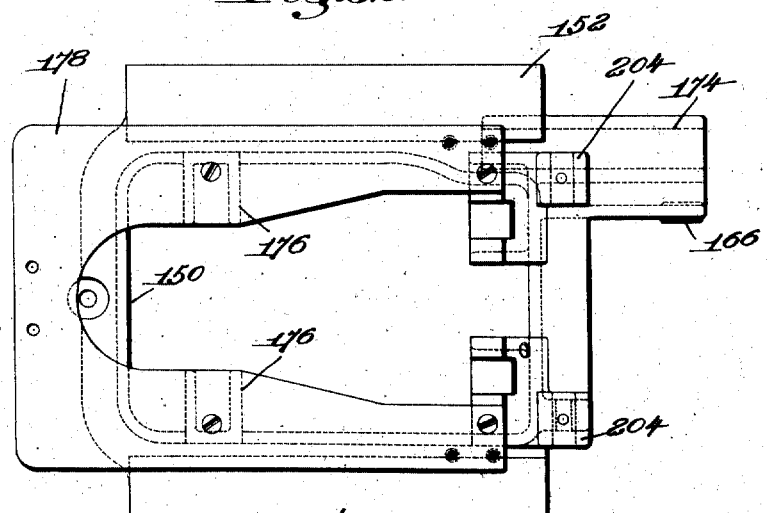

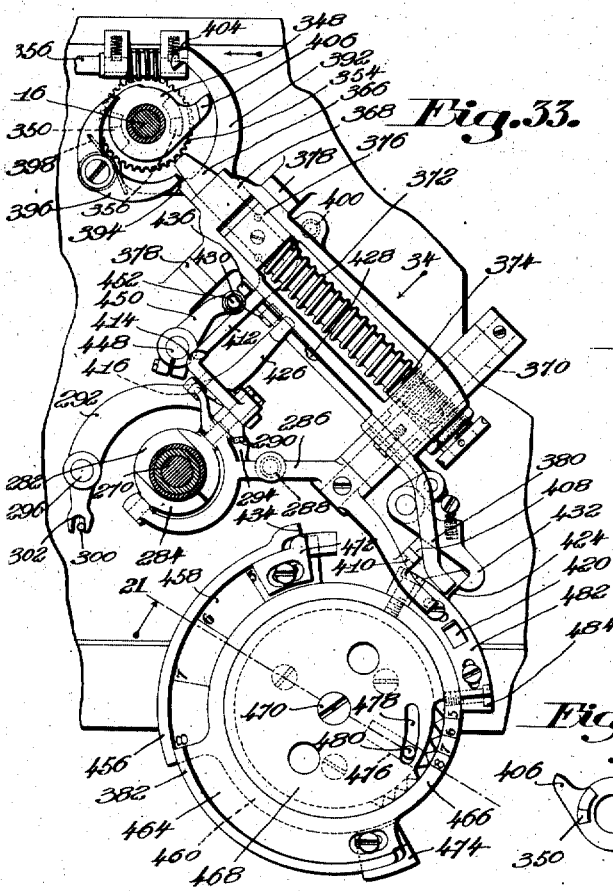

G. S. HILL.
SEWING MACHINE.
APPLICATION FILED JUNE 19, 1916.

1,276,357.

Patented Aug. 20, 1918.
14 SHEETS—SHEET 14.

Witness
Frederick S. Greenleaf.

Inventor
George S. Hill
by Phillips Van Everen & Fish
Attys ped needle, a reciprocating under looper for coöperating with the upper needle at the sides of the buttonhole, a pair of upper loopers for cooperating with the upper needle at the eye of the buttonhole, and an under looper for coöperating with the upper needle at the eye of the buttonhole, together with spreaders for positioning the loops of the needle and looper threads. The machine is also provided with the usual thread fingers, take ups, tensions and controllers for the needle and looper threads, only so much of which is shown in the drawings as is thought necessary for a clear understanding of the invention.

UNITED STATES PATENT OFFICE.

GEORGE S. HILL, OF STRAFFORD, NEW HAMPSHIRE, ASSIGNOR, B_ MESNE ASSIGNMENTS, TO UNITED SHOE MACHINERY CORPORATION, OF PATERSON, NEW JERSEY, A CORPORATION OF NEW JERSEY.

SEWING-MACHINE.

1,276,357.

Specification of Letters Patent.  Patented Aug. 20, 1918.

Application filed June 19, 1916.  Serial No. 104,449.

*To all whom it may concern:*

Be it known that I, GEORGE S. HILL, a citizen of the United States, residing at Strafford, in the county of Strafford and State of New Hampshire, have invented certain new and useful Improvements in Sewing-Machines; and I do hereby declare the following to be a full, clear, and exact description of the invention, such as will enable others skilled in the art to which it appertains to make and use the same.

The invention relates to buttonhole sewing machines, in which a work holding clamp and a sewing mechanism are relatively moved to form overseam stitches about the buttonholes.

It is the object of the invention to improve and simplify the construction, arrangement and mode of operation of the various parts and mechanisms of a machine of this type whereby it is rendered more efficient and better adapted for operation at high speed. To this end the invention comprises the features of construction and combinations of parts hereinafter described and set forth in the claims.

The various features of the invention will be readily understood from an inspection of the accompanying drawings and the following detailed description of the machine shown therein.

Figure 39:
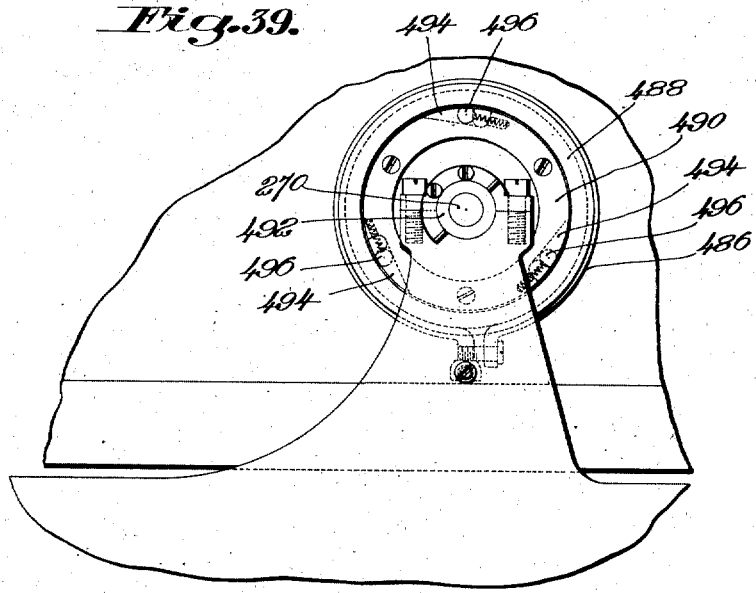
Figure 40:
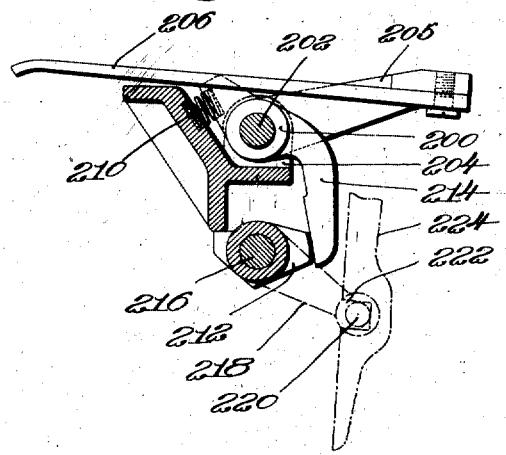

In the drawings, Figure 1 is a right-hand side elevation of a buttonhole making machine embodying the preferred form of the invention; Fig. 2 is a detail front view of a cap plate secured to the head of the machine and carrying a thread retainer; Fig. 3 is a plan view; Fig. 4 is a vertical sectional view on line 4 of Fig. 1; Fig. 5 is a detail view of the thread retainer for the upper needle thread; Fig. 6 is a vertical sectional view on line 6, Fig. 1; Fig. 7 is a detail sectional view through the hub of one of the driving pulleys; Fig. 8 is a detail sectional view on line 8, Fig. 6, showing the one-way driving clutch; Fig. 9 is a sectional plan view on line 9, Fig. 1; Fig. 10 is a vertical sectional view on line 10, Fig. 3; Fig. 11 is a detail view showing the means for securing the cutting brass in the cutter lever; Fig. 12 is a vertical sectional view on line 12, Fig. 3; Fig. 13 is a sectional elevation showing the rear end of the clamp carriage; Fig. 14 is a detail sectional view showing a part of the needle jogging mechanism, the section being taken on line 14 of Fig. 15; Fig. 15 is a sectional plan view on line 15, Fig. 14; Fig 16 is a sectional view through the hub of the gear which rotates the upper needle mechanism, the section being taken on the broken line 16 of Fig. 14; Fig. 17 is a detail sectional view taken substantially on the same line as Fig. 10, showing the parts on a larger scale; Fig. 18 is a detail sectional view of the turret carrying the under looper mechanism, a section being taken on line 18, Fig. 19; Fig. 19 is a plan view of the turret, the throat plate being removed; Fig. 20 is a detail sectional view on line 20, Fig. 19; Fig. 21 is a sectional view on line 21, Fig. 33, showing the means for adjusting the cams which control the driving mechanisms; Figs. 22 to 29 are diagrammatic views showing the mode of operation of the loopers and loop spreaders; Fig. 30 is a sectional view on line 30, Fig. 29; Fig. 31 is a detail plan view of the clamp carriage and parts carried thereby; Fig. 32 is a detail plan view of the clamp carriage; Fig. 33 is a detail side view showing the devices for controlling the driving mechanisms; Fig. 34 is a view looking in the direction of the arrow 34 in Fig. 33; Fig. 35 is a detail of the parts shown in Fig. 33; Fig. 36 is a view looking in the direction of the arrow 36 in Fig. 35; Figs. 37 and 38 are detail views showing parts of the mechanism for controlling the sewing clutch; Fig. 39 is a detail side elevation showing a device for retaining the machine frame in any position to which it may be tilted or raised by the operator; and Fig. 40 is a sectional detail showing the devices for closing and opening the work clamp.

In the drawings the invention is shown embodied in a machine for making buttonholes in which the overseam stitches extend along the sides and about the eyed end of the buttonhole, the buttonhole slit being cut after the completion of the sewing. The machine comprises in general a cutter, a reciprocating and laterally moving work clamp, and a sewing mechanism which is rotated during the sewing about the eye of the buttonhole, and which comprises a vertically reciprocating and laterally vibrating or jogging upper needle and two alternately acting loopers and loop spreaders, one of the loopers carrying an under thread.

As shown, the upper needle 2 is secured in the lower end of a hollow needle bar 4 which is mounted to reciprocate within a laterally vibrating carrier sleeve 6 (Figs. 4, 10, 14, 15 and 16). The needle bar is reciprocated by a crank 8 secured on the forward end of the needle shaft 10, the rear end of which carries a beveled pinion 12 engaged and driven by a beveled gear 14 of twice its diameter secured to the sewing shaft 16 (Fig. 3). The crank is connected to the needle bar by a link 18, the opposite ends of which engage ball joints on the crank and upper end of the needle bar. The means for laterally vibrating the carrier sleeve 6 comprises a link 20, one end of which is connected to the lower end of the sleeve, and the other end of which is mounted on a stud 22 secured in a rotary head 24. The upper end of the sleeve is connected to the horizontal arm of a bell crank rock lever 26 by a ball joint. The vertical arm of the bell crank lever is connected to the forward end of a rod 28 by a pivot block 30 which is adjustably secured on the arm by a bolt passing through a slot in the arm. The rear end of the rod 28 is provided with an eccentric strap 32 engaging an eccentric 34 on the sewing-shaft 16. When the carrier sleeve is moved downward from the position indicated in Fig. 14, the link 20 will act to swing the lower end of the carrier and the needle bar toward the right, so that the needle will be in position to form the depth stitch of the overseam. When the carrier sleeve is raised, the link will act to swing the sleeve toward the left into the position indicated in Fig. 14, thus bringing the needle into position to form the slit or edge stitch of the overedge seam. Since the needle shaft 10 makes two revolutions for each revolution of the sewing shaft 16, the eccentric on the shaft 16 will move the needle carrier to the right during one reciprocation of the needle, and to the left during the succeeding reciprocation, so that the needle will be laterally vibrated or jogged during the sewing to alternately form the depth and edge or slit stitches. That part of the stud 22 which is engaged by the link 20 is eccentric to the parts of the stud which engage the head 24, so that the point at which the needle penetrates the work in making the slit stroke may be accurately adjusted by turning the stud and then securing it in adjusted position. The amplitude of the vibrations of the needle, and consequently the distance between the depth and edge stitches, may be varied by adjusting the pivot block 30 in the arm of the bell crank lever 26.

The lower end of the needle carrier sleeve 6 is rectangular in shape, and fits within a guide slot 36 formed in the head 24. The key block 38 is secured to one side of the carrier sleeve forming a continuation of the rectangular lower end of the sleeve, and also fits within the guide slot 36. The key block is provided with a key 40 which projects through a longitudinal slot in the carrier sleeve, and into a keyway 42 in the needle bar, thus holding the needle bar against rotation within the sleeve, and also connecting it with the sleeve and head 24, so that the sleeve, head and bar will rotate in unison when rotary motion is imparted to the head. The head is secured to the lower end of the hub 44 of a bevel gear 46 by screws 48, the head being held against rotation with relation to the gear hub by lugs 50 which enter recesses 52 in the lower end of the hub. The bevel gear is mounted in a bearing in the machine frame, and is connected through a gear 54 to a shaft 56 through which the upper needle mechanism is rotated during the sewing about the eye of the buttonhole.

The shaft 56 is operated to rotate the upper needle mechanism through a lever 58 provided at its end with a gear segment engaging a gear 60 on the end of the shaft. The segment lever is connected by a link 62 with a similar segment lever 64 which is provided with an arm 66 carrying a roll engaging a cam groove 68 formed in the face of a gear 70 secured to the cam shaft 72. The gear segment on the end of the lever 64 engages a gear 74 on the rear end of a shaft 76, the front end of which carries a gear 78 engaging a similar gear 80 secured to the lower end of the rotary turret 82 on which the loopers and loop spreaders of the sewing mechanism are carried. The turret is provided with upper and lower cylindrical bearing surfaces engaging corresponding bearing surfaces in the turret bracket 84, and is rotated in unison with the head which carries the upper needle mechanism during the sewing about the eye of the buttonhole, and is rotated in the opposite direction after the completion of the buttonhole to bring the sewing mechanism into initial position through the connection described.

The two looper points 86 and 88 which coöperate with the upper needle in forming the stitches are secured in the arms 90 of a looper carrier 92 which is provided with two bearings 94 mounted to turn on the inner ends of studs 96 which are secured in lugs 98 projecting from the upper edge of the turret (Figs. 17 to 19). The looper 86 is provided with a thread guide and thread eye for the under thread carried by this looper. The looper carrier is oscillated through a link comprising a lower tubular part 100, to the upper end of which is adjustably secured an arm 102 pivotally connected at its upper end to the looper carrier. The lower end of the link is connected by a ball joint with the forward end of a lever 104, the rear end of which is connected to the lower end of a rod 106. The upper end of the rod carries a fork 108 which embraces a three-cornered eccentric 110 on the sewing shaft 16. The fork is supported and guided by a link 112. The loop spreaders which coöperate with the loopers comprise two spreader points 114 and 116 secured in the upper ends of two vertical arms of a spreader carrier lever 118 and arranged to overlie the loopers 86 and 88. The spreader carrier is mounted on a pivot 120 carried by the looper carrier and arranged at right angles to the axis of the looper carrier. The carrier lever is provided with a horizontal arm 122 arranged substantially in the axis of the looper carrier, and having its outer end connected by a ball and socket joint to the upper end of an arm 124, the lower end of which is adjustably secured to the upper end of a tube 126 which extends down through the tube 100, and is connected at its lower end by a ball joint to the forward end of a lever 128, the tube and arm forming a link connecting the lever 128 with the spreader carrier lever. The under looper thread passes up through the tube 126 to a tension device 127 on the turret, from which it leads through suitable thread guides to the looper 86. The spreader carrier lever is oscillated by an eccentric 130 on the needle shaft 10 which engages the upper end of a rod 132, the lower end of which is connected to the rear end of the lever 128. In this construction the transverse loop spreading movements are not effected by or dependent upon the reciprocatory movements of the carriers, but are effected independently of such reciprocatory movements, and by positive connections between the transversely movable carrier and the actuating eccentric or other actuator. The looper and spreader mechanism is therefore well adapted for operation at maximum speed.

Figure 23:
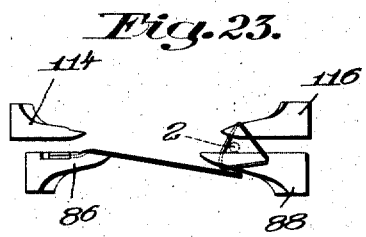
Figure 24:
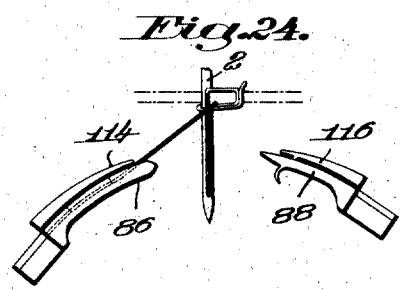
Figure 25:
Figure 26:
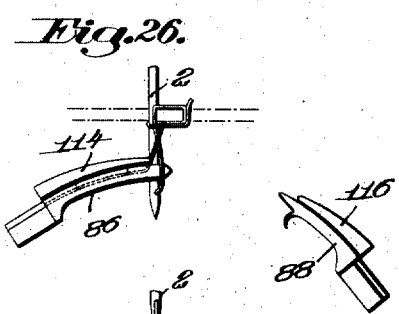
Figure 27:
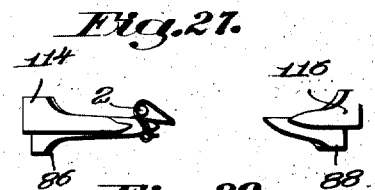
Figure 29:
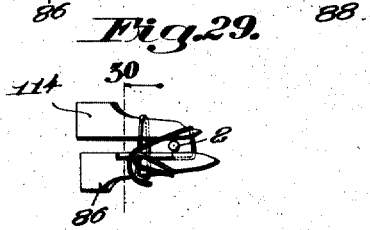
Figure 28:
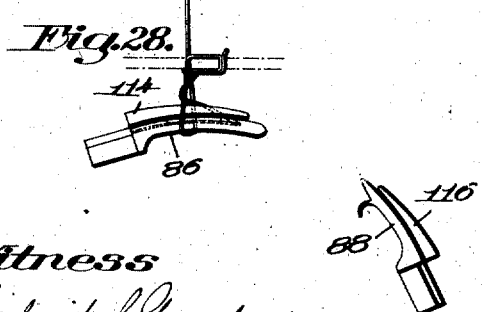
Figure 30:
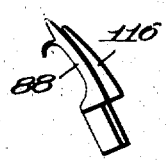

The mode of operation of the loopers and spreaders in coöperating with the upper needle to form the overedge stitches is illustrated in Figs. 22 to 30. During the depth stroke of the upper needle the looper carrier is rocked toward the left in Fig. 22 to project the end of the looper 88 and the overlying spreader point 116 through an upper needle loop thrown out by the needle as its starts upward from its lowest position. This loop is carried toward the left by the looper 88 into the position indicated in Fig. 22, and as it is carried into this position the spreader lever is rocked transversely of the direction of travel of the looper to spread the loop, as indicated in Fig. 23, so that during the slit or edge stroke of the needle it will pass down through the loop of upper thread. After the needle has entered the loop, the looper carrier is rocked toward the right, the spreader lever being rocked to return the spreaders to initial position, as indicated in Figs. 24 and 25. During the continued movement of the looper carrier toward the right, the looper 86 and overlying spreader point 114 pass through a loop thrown out by the needle as its starts upward, the position of the parts as the looper is entering the needle loop being indicated in Figs. 26 and 27. The continued movement of the looper carrier toward the right carries the under looper thread through the loop of needle thread, and the spreader lever is rocked to move the spreader transversely of the looper and spread the looper thread and present it in position for the passage of the needle during its next depth stroke, as indicated in Figs. 28 and 29. After the needle has passed through the loop of looper thread, the looper carrier is again rocked toward the left, the spreader lever being rocked to return the spreaders into position above the loopers, so that the looper 88 and spreader 116 may again take a loop of upper thread from the needle, spread it, and present it in position for the passage of the needle during its next slit stroke. The overseam stitch thus formed by the needle and loopers is the well-known Humphrey stitch.

In addition to the looper mechanism, the turret 82 carries a throat plate 134 which is clamped in the upper end of a bracket 136 secured to the upper edge of the turret. The throat plate is provided with the usual needle opening and guide for a stay cord, which may be led to the throat plate through a guide 138 formed in an arm secured to the turret bracket.

The upper needle thread passes from the eye of the needle up through a light tension device 140 mounted on the side of the needle bar, up through the hollow needle bar, and from the upper end of the needle bar it passes laterally under a thread guiding finger 142 to a tension device 144, from which it leads through suitable guides to the thread supply (Figs. 4, 5, 12 and 17). The thread guiding finger 142 and tension device 144 are arranged at one side of the needle bar, and the finger is mounted so that it may be adjusted vertically to vary the takeup action of the needle bar as it is retracted. In order to retain or hold the thread substantially taut during the downward stroke of the needle, and until the needle eye enters the work, a thread retainer 146 is arranged adjacent to the upper end of the needle bar when the bar is in retracted position, and is constructed to frictionally retain the thread until the thread is withdrawn therefrom by the downward stroke of the needle after its eye has entered the work and the needle is acting to carry a loop below the work. As shown, this thread retainer comprises a spring clip secured to the cap 148, which is removably secured to the head of the machine in front of the upper needle mechanism. During the final upward movement of the needle bar, the thread passes between the members of the clip, as indicated in dotted lines in Fig. 4. During the first part of the downward stroke of the needle bar, the thread retainer frictionally holds the thread, so that the needle slides down the standing thread until its eye enters the work. Thereafter the pull on the thread withdraws the thread from the thread retainer, so that slack thread is provided between the upper end of the needle bar and the tension device for the loop carried below the work by the needle. During the upward stroke of the needle bar the upper end of the needle bar acts as a takeup to set the stitch, and thereafter draws thread through the tension device for the succeeding stitch.

The work clamps are mounted upon a clamp carriage 150 provided with side flanges 152 which fit between bearing surfaces formed on the under side of the base plate 154 and the upper side of the turret bracket (Figs. 4, 9, 10, 12, 13, 31 and 32). The forward end of the clamp carriage is connected by a pivot bolt 156 with a sliding block 158 mounted to slide lengthwise of the button hole in a guideway 160 formed in the turret bracket. The clamp carriage is moved longitudinally or lengthwise of the buttonhole by a cam 162 formed in the face of the gear 70, and engaging a roll carried on the rear end of a bar 164, the forward end of which is pivotally connected to the carriage at 166 (Fig. 12). The rear end of the bar is supported and carried on a link 168. The clamp carriage is moved laterally during the sewing about the eye of a buttonhole by a cam 170 secured to the cam shaft 72 and engaging a roll on the rear end of a lever 172. The forward end of the lever carries a roll engaging a slot 174 formed in the clamp carriage.

The clamp carriage is mounted to slide and swing below the base plate of the machine, and is provided with upwardly projecting supports 176 on which a guard plate 178 is secured. The guard plate is arranged to project over the opening in the base plate of the machine, and to cover the space between the forward end of the camp carriage and the forward end of the opening in the base plate when the carriage is in retracted or stopping position. The plate therefore guards against injury to the operator when manipulating the machine with the work supporting plates removed from the carriage.

The lower work clamping jaws 180 are formed or secured on work supporting plates 182 which are pivoted at 184 to the guard plate 178. The upper clamping jaws 186 are carried in the forward ends of clamp arms 188 which are pivoted on blocks 190 adjustably secured on the plates 182. The plates and clamping jaws are held yieldingly in forward position by bars 192, the forward ends of which are provided with downwardly projecting extensions entering slots in the plates, and the rear ends of which are provided with knurled heads and with adjustable retaining and stop screws 194. The bars are mounted in brackets 196 secured to the upper side of the guard plate 178, and are forced forward by springs 198. These plate retaining and positioning devices are the same in construction as the devices shown and described in Patent No. 1,063,880.

The devices for closing the clamps comprise a rock sleeve 200 mounted on a stud 202 which is secured in lugs 204 on the rear end of the clamp carriage. The rock sleeve is provided with two rearwardly extending arms 205, each of which carries a forwardly projecting spring arm 206. The forward ends of the arms 206 engage recesses in the lower arms 208 of the clamp arms 188. The rock sleeve is forced in a direction to open the clamps by a spring 210 (Fig. 40). The sleeve is rocked to close the clamps by a cam 212 arranged to engage an arm 214 depending from the rock sleeve. The cam is formed on one arm of a lever which is mounted on a stud 216 secured to the clamp carriage. The other arm 218 of the lever is provided with a laterally projecting pin 220 arranged to enter a notch 222 in a vertical link 224 when the clamp carriage is in retracted or stopping position. The link 224 is pivotally connected at its upper end to the forward end of a bell crank lever 226, the other end of which carries a roll engaging a cam 228 secured to the cam shaft 72. The lower end of the link is forced forward by a spring 230, and its forward movement is limited by a stop 232 at it supper end which engages a corresponding stop on the end of the bell crank lever.

When the clamp is in retracted position the pin 220 is in the recess in the link 224, and the cam lever is in the position indicated in Figs. 10 and 12, the clamps being open. When the machine is started, and the cam shaft begins to rotate, the cam lever is rocked into the position indicated in Fig. 40 to close the clamp, and to bring the concentric high part of the cam 212 back of the arm 214, so that the cam will retain the clamps in closed position during the travel of the work carriage, and until the carriage is returned to initial or stopping position. As the clamp carriage comes into this position, the pin 220 on the cam lever enters the recess in the link 224, the link yielding so that the notch will be maintained in engagement with the pin. After the clamp carriage has come into this position, and during the final movement of the cam shaft, the bell crank lever 226 is rocked, raising the link 224 from the position indicated in dotted lines in Fig. 40 to the position indicated in Fig. 12, thus rocking the cam lever 218 to open the clamps.

The buttonhole slit is cut after the completion of the sewing, and after the clamp carriage has been retracted into starting position, by cutting devices comprising a cutting blade and eye die 234 which is clamped in the upper part of a knife block 236 secured in position on the turret bracket by a removable locking plate 238 (Fig. 17). The knife block is provided with a chip passage 240 leading from the eye die of the cutting knife to a chip passage 242 formed in the turret bracket. The knife block is also provided with cam lugs 244 arranged to be engaged by the spreader cams 246 on the clamp plates. Coöperating with the cutter knife 234 is a cutter block or brass 248 secured in the forward end of a cutter lever 250 which is mounted on fulcrum screws 252 (Fig. 4). The cutter lever is operated through a lever 254 secured to a shaft which is mounted in the cutter lever in line with and between the ends of the fulcrum screws. The lever 254 has a vertical arm engaging an adjusting screw 256 on the lever 250. A spring 258 is mounted in a recess in the frame, and forces a pin against a rearwardly projecting arm on the lever 250 to normally hold the cutter lever in raised position (Fig. 10). The rear end of the actuating lever 254 carries a roll arranged to engage a cam 260 on the cam shaft 72. By adjustment of the screw 256 the parts may be adjusted so that the cutter block will be forced properly against the cutter plate as the roll on the end of the actuating lever rides over the high part of the cutter cam 260.

The brass 248 is preferably provided with a spring pressed pin 262 which normally projects beyond the face of the brass, and is in position to engage the work above the eye die of the knife blade. This pin will yield as the brass is forced against the work, and after the eye die has cut through the material, will spring forward and force the material through the eye die, so that it will drop freely through the chip passage, thus preventing clogging of the eye die. The brass is removably secured in the end of the cutter lever, and is positioned by a pin 264 arranged to engage an open slot in the forward end of the brass. The brass is locked in position on the cutter lever by a locking bolt 266, the head of which is arranged to enter a recess in the side of the brass, as indicated in Fig. 11.

The cam shaft 72 makes a single revolution during each cycle of the machine. It is driven at a comparatively high speed when the machine is started to close the clamp and to move the work carriage forward from cutting to sewing position, is then driven at a comparatively slow speed through connections with the sewing shaft 16 during the sewing of a buttonhole, and is then again driven at comparatively high speed through the remainder of its revolution to return the clamp carriage to cutting position, to operate the cutter, to open the clamp, and to turn the sewing mechanism back to initial position, this mechanism having been turned through a half revolution during the sewing about the eye of the buttonhole. The mechanism for driving the cam shaft at a comparatively high speed before and after the sewing comprises a high speed clutch member 268 mounted on a shaft 270 which is connected to drive the cam shaft through a pinion 272 engaging the cam gear 70 (Figs. 1, 4, 6, and 33 to 36). The clutch member 268 is formed on a sleeve adapted to slide on the shaft 270, and is provided with clutch teeth adapted to engage corresponding teeth formed on a clutch member 274 secured to the shaft. The clutch member 268 is connected with a driving pulley 276 by means of a pin 278 which passes through a slot in the hub of the pulley and is engaged by a spring 280 arranged within a recess in the pulley (Fig. 7). The pulley is held in position on the clutch sleeve by a collar 282 screwed on to the end of the sleeve, and provided with an annular groove for receiving the shoes 284 of a clutch operating lever 286. The lever is provided at its forward end with a yoke, in the arms of which the shoes 284 are pivoted, and is forced in a direction to engage the clutch by a spring 288 (Figs. 33 and 34). When the machine is in stopped position the clutch lever is latched in clutch disengaging position against the action of the spring 288 by a latching projection 290 formed on a latch lever 292 and arranged to engage a lug 294 on the clutch lever (Figs. 35 and 36). The latch lever 292 is secured upon a rock shaft 296, to which is also secured the starting lever 298. The starting lever projects forward into position adjacent to the work clamp, where it can be readily operated by the operator when she positions the work in the work clamp. The movement of the rock shaft 296 in either direction is limited by a stop pin 300 projecting into a slot 302 formed in a downward projecting arm of the lever. When the operator depresses the starting lever, the latch 290 is disengaged from the clutch lever, so that the clutch is engaged to drive the cam shaft. The clutch lever is operated and controlled during the cycle of the machine by devices which will be described later on.

The cam shaft is driven from the sewing shaft during the sewing through a one-way roller clutch, the driven member of which consists of a disk 304 secured to the hub of the pinion 272, and the driving member of which comprises a flange 306 which encircles the disk 304 and is formed on a sleeve 308 loosely mounted on the shaft 270, (Figs. 6 and 8). The disk 304 is recessed to receive the rolls 310 which are forced into wedging engagement with the bottoms of the recesses and the inner periphery of the flange 306. by the springs 312. The driving sleeve 308 of the clutch is provided with a spiral gear 314 which is engaged by a similar gear 316 secured to a vertical shaft 318, the upper end of which carries a worm wheel 320 engaged by a worm 322 secured to the sewing shaft (Fig. 12). When the high speed clutch 268 is driving the cam shaft. the clutch disk 304 turns idly within the driving member 306 of the one-way clutch. When the high speed clutch is thrown out, and the sewing shaft started, the driving member 306 of the one-way clutch picks up the driven member of the clutch and drives the shaft 270 and cam shaft 72.

In order to enable the speed of the cam shaft with relation to the sewing shaft to be varied to vary the number of stitches in a buttonhole, provision is made for readily changing the worm wheel 320. To this end the lower end of the shaft 318 is mounted in a support or casing 324 pivotally supported upon the clutch sleeve 308 and upon one of the bearings for the shaft 270, and the worm wheel 320 is detachably connected with the upper end of the shaft by a pin 326 arranged to enter a hole in the web of the wheel. The worm wheel is mounted in a removable plate 328, and is bored to fit over the upper end of the shaft 318. The bearing plate 328 for the worm wheel is provided with three arms, two of which rest upon the bearing brackets for the worm 322, and the other of which fits within a recess in the machine casing. The latter arm is held in position by a pin 330, and this arm, as well as the other two arms, are clamped in position by the cover 332 which closes the top of the casing above the driving gear. The cover is hinged to the casing and is latched in closed position by a spring latch 334. When the number of stitches in a buttonhole is to be changed, the cover 332 may be readily raised, thus permitting the bearing plate 328 and worm wheel 320 to be removed and another bearing plate and worm wheel of different size to be placed in position.

The driving and stopping mechanism for the sewing shaft comprises a clutch member 336 secured to the shaft and a coöperating clutch member on a driving pulley 338. The driving pulley is mounted on a sleeve 340 which may be slid on the shaft 16, and is forced in a direction to engage the clutch by a spring 342. The pulley is moved against the tension of the spring to disengage the clutch through pins 344 which pass through the hub of the clutch disk and are interposed between the end of the sleeve 340 and a plate 346 which surrounds one of the bearing sleeves for the shaft 16. A ball bearing is interposed between the disk and the end of a clutch actuating sleeve 348 which is mounted to turn loosely on the bearing sleeve. The clutch actuating sleeve is provided with two cam segments 350 arranged to coöperate with cam segments 352 formed on a stationary disk 354. The stationary disk 354 may be readily adjusted by the operator by means of a shaft 356, the forward end of which is provided with a knurled head, and the rear end of which is provided with worm engaging teeth on the periphery of the disk. The means for rocking the cam sleeve 348 to disengage the clutch, and for releasing it to allow the spring 342 to engage the clutch, will be described later in connection with the devices for stopping the sewing shaft in predetermined position.

The devices for stopping the sewing shaft comprise a stop cam 358 mounted on the hub of the clutch 336 and connected with the clutch by a pin 360 which passes through a segmental slot in the side of the clutch, and is engaged by one end of a spring 362, the other end of which bears against a lug 364 on the clutch disk. Coöperating with the stop cam is a stop plunger 366 mounted to move lengthwise in a plunger carrying lever 368. The lever is mounted to turn on the shaft 370, to the lower end of which the high speed clutch lever 286 is secured (Figs. 33 and 34). The stop plunger is forced forward in its carrying lever by a heavy spring 372 interposed between the end of an adjusting sleeve 374 and a block 376 secured to the plunger and fitting within a guideway in the lever. The upper end of the lever is supported and guided between guide lugs 378 projecting from the machine frame. The lever is provided with an arm 380, the end of which is arranged in the path of a controlling cam 382 mounted on the end of the cam shaft 72. The stop cam is provided with a braking eccentric portion 384, a stopping depression 386, and a swell or eccentric portion 388 following the depression. The low part of the cam 390 is somewhat nearer the axis of the cam than the stopping depression 386.

When the sewing clutch is to be engaged, the stop plunger lever is swung about its pivot to carry the upper end of the stop plunger laterally out of engagement with and out of the path of the stop cam. As the plunger passes laterally off the cam, it moves forward slightly until the block 376 brings up against the end of its guide slot. This forward movement of the plunger is utilized to throw in the sewing clutch. The plunger carries an arm 392 secured to the side of the block 376, and projecting upward, as indicated in Figs. 33 and 34. When the plunger moves forward slightly, as above described, a lug 394 on the arm 392 strikes the tail of a pawl 396, which has been holding the clutch operating cam disk 348 in clutch disengaging position, and disengages the pawl from the disk, so that the disk is free to rock. This permits the spring 342 to engage the clutch, the cam disk 348 being turned by the engagement of its cams with the cams 352 as the clutch pulley moves forward on the shaft. The latch 396 is arranged to engage a notch in the edge of the cam disk, and is forced toward the disk by a spring 398. The controlling cam 382 holds the plunger lever in position with the plunger out of the path of the stop cam until the sewing is completed, at which time the end of the arm 380 rides off the cam, permitting a spring 400 to force the plunger carrying lever laterally into the path of the cam. The side of the plunger first rides against the side of the cam and rides along a cam surface 402 which terminates at the low part of the cam. As the rotation of the sewing shaft 16 continues, the plunger rides along the periphery of the braking portion 384 of the cam, and is thus forced back against the tension of the spring 372 until the end of the plunger enters the stopping recess 386. As the plunger is forced back by the stopping cam, a projection 404 on the end of the arm 392 engages an arm 406 on the cam disk 348 and rocks the cam disk to disengage the sewing clutch and bring the notch in the disk into position to be engaged by the latch 396. The latch retains the cam disk in clutch disengaging position until it is again tripped by the forward movement of the stop plunger at the beginning of the next succeeding sewing operation. The sewing clutch is disengaged by the plunger as it starts up the eccentric braking portion of the stop cam, and at a uniform interval before the shaft reaches its stopping position. The timing of the disengagement of the clutch with relation to the stopping position may be readily varied by the operator to secure the most efficient action of the stopping mechanism by adjustment of the stationary cam disk 354.

As above explained, the high speed driving clutch should be disengaged when the sewing clutch is thrown into operation. In the construction shown, the disengagement of the high speed clutch is effected by the movement of the stop plunger carrying lever which moves the plunger laterally away from the stop cam. As indicated in Figs. 33 and 34, the arm 380 of the stop plunger lever is provided with a lug 408 which underlies a lug 410 on the rear arm of the high speed clutch lever 286. When the arm 380 rides up on to the cam 382, the lug 408 swings the clutch lever 286 to disengage the high speed clutch and bring the lug 294 on the lever into position to be engaged by the latch 290 on the latch lever 292. When the arm 380 rides off the cam 382 at the completion of the sewing, the clutch lever 286 is retained in clutch disengaging position by the latch 290 until the sewing shaft is brought to rest by the engagement of the stop plunger with the stopping depression in the stop cam. As the stop plunger moves forward into the depression, a projecting arm 412 connected with the stop plunger engages the hooked end of a dog 414 which is pivoted on the latch lever 292, and rocks the latch lever to disengage the latch 290 from the lug on the clutch lever 286, so that the high speed clutch is engaged as the sewing shaft comes to rest. The dog 414 is pivoted on the latch lever 292, and is held in engagement with a stop pin 416 on the clutch lever 286 by a spring 418. When the clutch lever is released, as above described, and shifted to engage the high speed clutch, the pin 416 rocks the dog to disengage it from the arm 412, so that the latch lever is free to return to latching position when the high speed clutch lever is shifted to disengage the high speed clutch as the cam shaft comes to stopping position. When the stop plunger lever swings laterally to bring the plunger into the path of the stop cam, the arm 412 will strike against the side of the dog 414, swinging the dog laterally. As the stop plunger is pushed back by the braking portion of the stop cam, the arm 412 will pass below the hooked end of the dog, so that the dog may snap into position above the arm, where it will be engaged by the arm when the stop plunger moves into the stopping recess as above described.

The high speed clutch is disengaged as the cam shaft comes into stopping position by a cam 420 carried by the cam shaft, and arranged to engage the rear end of the clutch lever 286. The stopping position of the cam shaft is determined by a stop dog 422 arranged to engage a stop lug 424 carried on the outer end of the cam shaft. The dog is disengaged from the lug when the machine is started by an arm 426 projecting upward from the latch lever 292, and provided with a hole for embracing a rod 428 connected to the dog. The rod is provided with a head 430 which is engaged by the arm 426 when the latch lever is rocked to start the machine, and raises the stop dog to free it from the stop lug. When the high speed clutch is thrown out, and the sewing clutch thrown in, as above described, over-running of the cam shaft is prevented by a stop dog 432 similar to the dog 422, which is arranged to engage a stop shoulder 434 adjacent to the leading end of the cam 382. This dog is disengaged from the stop shoulder by the forward movement of the stop plunger as it is moved laterally from engagement with the stop cam, the arm 412 at this time underlying the hooked end of a rod 436 connected to the dog and operating on the rod to lift the dog free of the stop shoulder.

The main tension for the upper needle thread should be released at the completion of the sewing, and should be reapplied at the beginning of the next sewing operation. In the construction shown the releasing and application of the tension is effected through the movement of the stop plunger in starting and stopping the sewing shaft. As shown in Fig. 12, the outer disk of the tension device 144 is pressed against the inner disk by a rod 438 provided on its forward end with a head engaging the disk, and on its rear end with an adjustable nut 440. A spring 442 is interposed between the nut 440 and the bottom of a recess in the lug through which the rod 438 slides. A rod 444 extends rearwardly from the nut 440, and the rear end of the rod is in position to be engaged by the upper end of an arm 446 secured to a rock shaft 448. The outer end of the rock shaft 448 carries a second arm 450, in the upper end of which is mounted a spring pressed pin 452 (Figs. 1, 33, 34 and 36). The pin projects into position to be engaged by the arm 412 which is connected with the stop plunger. When the stop plunger is in stopping position, as indicated in Figs. 1 and 33, the pin 452 is engaged by the arm 412, and the rock shaft 448 is held in position to force the tension rod 444 forward, and thus relieve the tension on the upper needle thread. When the stop plunger lever is moved laterally in starting the sewing shaft, the arm 412 passes from under the pin 452, so that the tension rod is released and the tension disks are pressed together by the spring 442 thus applying the tension. When the stop plunger lever is returned into position to ride on the stop cam, the arm 412 strikes the end of the pin 452, which yields as the lever moves laterally. When the plunger rides up the braking portion of the cam, the arm 412 passes below the pin, which immediately snaps forward above the arm into position to be engaged by the arm when the plunger moves forward into the stopping recess in the stop cam.

In order to permit the machine to be readily adjusted for sewing buttonholes of different lengths, the cam 382 for controlling the throwing in and out of the sewing mechanism is so constructed that its length may be varied while maintaining the proper relation between the ends of the cam and the feed cam which reciprocates the work carriage. As shown in Figs. 1, 21 and 33, the cam 382 is mounted upon a disk 454 secured to the outer end of the cam shaft 72, and is formed in two sections. One section comprises a segmental flange 456 projecting laterally from a segmental plate 458 formed on a ring 460 which is mounted on a bearing 462 on the disk 454. The other section of the cam comprises a segmental plate 464 formed on a ring 466 and arranged to overlap the plate 458 with its outer face flush with and forming a continuation of the flange 456. The ring 466 is mounted to turn on the outer end of the bearing 462. The cam rings 460 and 466 are retained in position on the disk 454 by a clamping plate 468 having a conical periphery engaging a corresponding surface on the inner edge of the ring 466. The clamping plate is secured in clamping position by a screw 470, which may be loosened to permit the adjustment of the cam rings. The leading inclined end of the cam is formed on a cam piece 472 adjustably secured on the disk 458, and having its outer face flush with and forming a continuation of the cam flange 456. The rear end of the cam is formed by a separate cam piece 474 adjustably secured on the rear end of the plate 464, and having its outer face flush with and forming a continuation of this plate. After the cam pieces 472 and 474 have once been properly adjusted on the plates 458 and 464, they may remain permanently in position, the proper adjustment of the cam 382 being secured by adjustment of the two plates. The cam rings 460 and 466 are locked in adjusted position by a locking bolt 476 mounted to slide radially in the disk 454, and provided with a V-shaped outer end adapted to enter notches formed in the rings 460 and 466. The bolt is held in locking engagement with the notches by an eccentric slot 478 formed in the clamping plate 468, and engaging a pin 480 on the locking bolt. For convenience in quickly and accurately positioning the cam segments with relation to each other and with relation to the cam shaft, the cam ring 466 is provided with graduations on its front face opposite the locking notches formed therein, and the clamping plate 468 is cut away to render the notches and locking bolt visible. The front face of the plate 458 is also provided with graduations corresponding to the locking notches in the ring 460, which register with the end of the segmental plate 464 when the corresponding notch is in register with the locking bolt.

In Figs. 1 and 33 the cam 382 is shown adjusted for sewing the longest buttonhole for which it is adapted. To adjust the cam for sewing a shorter buttonhole, the screw 470 will be loosened, and the clamping plate 468 turned so that the eccentric slot 478 will act to withdraw the locking bolt from the notches in the cam rings 460 and 466. If the next shorter buttonhole is to be sewed, the cam ring 464 will be turned to bring the notch marked "7" into register with the locking pin, and the ring 460 will be turned to bring the line marked "7" on the plate 458 into register with the end of the plate 464. This will shorten the cam 382 to the proper extent, and will also bring the ends of the cam into proper relation to the feed cam on the cam shaft so that the sewing will begin and end at the end of the buttonhole slit. After the adjustment is made, the clamping plate 468 will be turned to force the locking bolt into the registering notches of the two cam rings, and the plate will then be secured in position by tightening the screw 470.

The cam 420 for disengaging the high speed clutch after the machine has completed a cycle, is formed on a plate 482 adjustably secured to a block 484, which is in turn secured to the rim of the disk 454.

The frame of the machine is pivotally supported upon the machine base, so that it may be readily swung up to give access to the mechanisms within the lower part of the frame. As shown, the frame is pivoted on the bearings for the shaft 270, which are formed in arms projecting from the machine base (Figs. 1, 4 and 6). To hold the machine frame in position when it is swung up, and to prevent accidental fall or rapid descent of the frame, which might result in injury to the operator or to the machine, the one-way braking device shown in Figs. 4, 6 and 39 is provided. As shown, this device comprises a friction brake band 486 surrounding a ring 488, which in turn surrounds a ring 490 secured to the machine frame concentric with the bearing 492 on which the frame is pivotally supported.

The ring 490 is provided with recesses 494 for receiving the spring pressed balls 496, the balls and recesses being so arranged that no resistance is offered to the movement of the machine frame as it is swung up. When the machine frame is swung in the opposite direction, however, the balls act to connect the ring 490 with the brake ring 488, so that the downward movement of the frame is frictionally resisted or prevented by the brake band 486.

While the invention has been shown and described as embodied in a machine for sewing a two-thread overseam, in which the upper thread is carried by a transversely vibrating needle, and in which the under thread is carried by one of two reciprocating looper points, it will be understood that many features of the invention are not confined in their application to this specific form of sewing mechanism, or to a mechanism forming a two-thread overseam, but may be embodied with advantage in machines embodying other forms of sewing mechanism and adapted to sew other types of stitches. It will also be understood that the broader features of the invention are not limited to the specific constructions shown and described, but may be embodied in other structures, the specific construction and arrangement of parts being varied or modified as found desirable or best suited to the machine in which the feature is to be embodied, or to the structure of the mechanism with which it is to coöperate.

The frame holding device shown and described is covered by the claims of application Serial No. 92,943, filed April 22, 1916. The looper mechanism shown and described is covered by the claims of a divisional application Serial No. 155,847, filed March 19, 1917. The mechanism for jogging the upper needle shown and described is covered by the claims of a divisional application Serial No. 155,848, filed March 19, 1917. The devices for controlling the needle thread between the needle bar and source of supply shown and described are covered by the claims of a divisional application, Serial No. 167,933, filed May 11, 1917.

Having explained the nature and object of the invention, and specifically described one form of machine in which it may be embodied, what is claimed is:—

1. A sewing machine, having, in combination, an upper needle mechanism, complemental under mechanism coöperating therewith to form overseam stitches, a rotary head for the upper needle mechanism, a rotary turret for the under mechanism, horizontal shafts geared to the head and turret, connected segments for rotating the shafts, and a horizontal shaft provided with a cam for rocking the segments.

2. A sewing machine, having, in combination, an upper needle mechanism, complemental under mechanism coöperating therewith to form overseam stitches, a rotary head for the upper needle mechanism, a rotary turret for the under mechanism, horizontal shafts geared to the head and turret, bevel gears on the rear ends of the shafts, segment levers engaging the gears, a horizontal cam shaft, a cam thereon engaging one of the levers, and a link connecting the levers.

3. A sewing machine, having, in combination, a vertically reciprocating needle bar, a horizontal needle shaft provided with a crank at its forward end, a link connecting the crank and needle bar, a sewing shaft geared to drive the needle shaft at double speed and arranged transversely thereto, complemental under sewing mechanism, and needle jogging mechanism driven from the sewing shaft.

4. A sewing machine, having, in combination, a vertically reciprocating needle bar, a horizontal needle shaft provided with a crank at its forward end, a link connecting the crank and needle bar, a transverse sewing shaft geared to drive the needle shaft at double speed, under looper and spreader mechanism, an eccentric on the sewing shaft for reciprocating the looper and spreader mechanism, an eccentric on the needle shaft for actuating the spreader mechanism, an eccentric on the sewing shaft, and mechanism for jogging the needle bar operated by said last mentioned eccentric.

5. A sewing machine, having, in combination, stitch forming mechanism, a clamp carriage, clamps on the carriage, a rock shaft on the carriage having spring arms engaging the clamps, a third arm on the shaft, a rock lever on the carriage having a cam engaging said third arm to close the clamps and hold them closed, and mechanism for rocking the shaft to close and open the clamps.

6. A sewing machine, having, in combination, stitch forming mechanism, a clamp carriage, clamps on the carriage, a rock shaft having rearwardly projecting arms, forwardly extending spring arms secured thereto and engaging the clamps, a third arm on the rock shaft, a cam lever provided with a cam engaging the third arm, and mechanism for rocking the lever to close and open the clamps.

7. A sewing machine, having, in combination, stitch forming mechanism, a clamp carriage, clamps on the carriage, a rock shaft on the carriage having spring arms engaging the clamps, a third arm on the shaft, a cam lever provided with a cam engaging the third arm to close the clamps and hold them closed, and mechanism for rocking the shaft to close and open the clamps constructed to control the movement of the lever during the opening of the clamps.

8. A sewing machine, having, in combination, stitch forming mechanism, a reciprocating clamp carriage, work clamps on the carriage, clamp operating mechanism on the carriage, and relatively fixed actuating mechanism for closing and opening the clamps which is connected with the mechanism on the carriage by the movement of the carriage into stopping position and is disconnected therefrom by the forward feed of the carriage.

9. A sewing machine, having, in combination, stitch forming mechanism, a reciprocating clamp carriage, clamps on the carriage, a cam lever on the carriage for closing the clamps and holding them closed, and relatively fixed mechanism for rocking the lever to close and open the clamps which is connected with the lever when the lever is in stopping position and is disconnected therefrom by the forward travel of the carriage.

10. A sewing machine, having, in combination, stitch forming mechanism, a reciprocating clamp carriage, clamps on the carriage, a rock shaft provided with spring arms for closing the clamps, a cam lever for rocking the rock shaft, and relatively fixed mechanism for rocking the lever to close and open the clamps which is connected with and disconnected from the lever by the movement of the carriage.

11. A sewing machine, having, in combination, stitch forming mechanism, a reciprocating clamp carriage, clamps on the carriage, a cam lever on the carriage for closing and opening the clamps, an actuating cam mounted to rotate on a relatively fixed axis, a lever engaging the cam, and a link connected with the lever provided with a notch engaging the cam lever on the carriage to move it in both directions when the carriage is in stopping position.

12. A sewing machine, having, in combination, stitch forming mechanism, a clamp carriage, supporting guidways in which the carriage is horizontally movable, a sliding block to which the front end of the carriage is pivoted, a link connected to the carriage, a cam for reciprocating the link, and a lever for swinging the carriage laterally.

13. A sewing machine, having, in combination, stitch forming mechanism, a base plate provided with an opening, supporting guideways below the base plate, a clamp carriage mounted in the guideways, a guard plate on the carriage covering the space between the front end of the opening in the base plate and the front end of the carriage, removable work supporting plates overlying the guard plate and the opening in the base plate, clamps on the work supporting plates, and mechanism for moving the carriage longitudinally and laterally.

14. A sewing machine, having, in combination, stitch forming mechanism, a clamp carriage, supporting guideways in which the carriage is movable longitudinally and laterally, a longitudinally sliding block to which the forward end of the carriage is pivoted, a cam and connections for moving the carriage longitudinally, and a cam and connections for swinging the carriage laterally.

15. A sewing machine, having, in combination, stich forming mechanism, a clamp carriage, supporting guideways in which the carriage is horizontally movable, a sliding block to which the front end of the carriage is pivoted, a cam and connections for moving the carriage longitudinally, a longitudinal slot in the carriage, a lever engaging the slot, and a cam for operating the lever to swing the carriage laterally.

16. A sewing machine, having, in combination, stitch forming mechanism, a work clamp, a cutter below the work including an eye die, a coöperating cutter block, and a spring pressed pin projecting from the cutter block and arranged to register with the eye die.

17. A sewing machine, having, in combination, stitch forming mechanism, a work clamp, a cutter lever, a cutter block provided with an open slot in its end and a recess in its side, a positioning pin on the lever for engaging the open slot, and a locking bolt, the head of which enters the recess.

18. A sewing machine, having, in combination, sewing mechanism, a work clamp, feed mechanism for relatively moving the sewing mechanism and clamp to sew about a buttonhole, a cutter lever, fulcrum screws on which the lever is mounted, an actuating lever, and a shaft mounted in the cutter lever between the fulcrum screws to which the actuating lever is secured.

19. A sewing machine, having, in combination, sewing mechanism, a work clamp, feed mechanism for relatively moving the sewing mechanism and clamp to sew about a buttonhole, a cutter lever, fulcrum screws on which the lever is mounted, an actuating lever, a shaft mounted in the cutter lever between the fulcrum screws to which the actuating lever is secured, an adjusting screw on the cutter lever engaged by one arm of the actuating lever, a cutter cam for rocking the actuating lever, and a spring for holding the cutter lever in engagement with the actuating lever and the actuating lever in engagement with the cam.

20. A sewing machine, having, in combination, sewing mechanism, a work clamp, a transverse horizontal feed cam shaft connected to relatively move the sewing mechanism and clamp to sew about a buttonhole, a transverse horizontal drive shaft geared to drive the cam shaft, a sewing shaft, driving connections between the sewing and cam shafts, driving mechanism for the sewing and driving shafts, and mechanism operated by the feed cam shaft for rendering the driving mechanisms alternatively active.

21. A sewing machine, having, in combination, stitch forming mechanism, a work clamp, a buttonhole cutter, a cam shaft for operating the clamp and cutter and for effecting the feed, a one-way clutch, the driven member of which is geared to the cam shaft, a sewing shaft geared to continuously rotate the driving member of the clutch, and mechanism for driving the cam shaft at comparatively high speed while the sewing shaft is idle.

22. A sewing machine, having, in combination, stitch forming mechanism, a work clamp, a buttonhole cutter, a cam shaft for operating the clamp and cutter and for effecting the feed, a one-way clutch the driven member of which is geared to the cam shaft, a sewing shaft geared to continuously rotate the driving member of the clutch, high speed mechanism for driving the driven member of the clutch, mechanism for driving the sewing shaft, and mechanism for rendering the driving mechanisms alternatively active.

23. A sewing machine, having, in combination, stitch forming mechanism, a work clamp, a buttonhole cutter, a cam shaft for operating the clamp and cutter and for effecting the feed, a driving shaft geared to the cam shaft, a one-way clutch the driven member of which is secured to the driving shaft, a sewing shaft to which the driving member of the clutch is geared for continuous rotation during the rotation of the sewing shaft, mechanism for driving the sewing shaft during the sewing, and mechanism for driving the driving shaft when the sewing shaft is idle.

24. A sewing machine, having, in combination, sewing mechanism, a work clamp, feed mechanism for relatively moving the sewing mechanism and work clamp to sew about a buttonhole, a sewing shaft, a stop cam on the shaft, a spring pressed plunger for coöperating with the cam to retard and stop the shaft, means moving with the feed mechanism for controlling the movement of the plunger into and out of coöperative relation with the stop cam, and mechanism for throwing out the sewing shaft driving mechanism operated through the movement of the plunger by the stop cam.

25. A sewing machine, having, in combination, sewing mechanism, a work clamp, feed mechanism for relatively moving the sewing mechanism and work clamp to sew about a buttonhole, a sewing shaft, mechanism for driving the feed mechanism from the sewing shaft having provision for varying the relative speed of the feed mechanism, a stop cam on the sewing shaft, a spring pressed plunger for coöperating with the cam to retard and stop the shaft, cams moving with the feed mechanism for controlling the movement of the plunger into and out of coöperative relation with the stop cam, and mechanism for throwing out the sewing shaft driving mechanism operated through the movement of the plunger by the stop cam.

26. A sewing machine, having, in combination, sewing mechanism, a work clamp, feed mechanism, a sewing shaft, driving connections between the sewing shaft and feed mechanism including a one-way clutch, mechanism for driving the feed mechanism when the sewing shaft is idle, driving mechanism for the sewing shaft, a stop cam on the shaft, a spring pressed plunger for coöperating with the stop cam to retard and stop the shaft, cams moving with the feed mechanism for controlling the movement of the plunger into and out of coöperative relation with the stop cam, and mechanism for throwing out the sewing shaft driving mechanism operated through the movement of the plunger by the stop cam.

27. A sewing machine, having, in combination, sewing mechanism, a work clamp, feed mechanism, a sewing shaft, driving connections between the sewing shaft and feed mechanism, a stop cam for the sewing shaft having a stopping depression, a stop plunger for stopping the forward rotation of the shaft by engagement with the cam, and a driver for the feed mechanism thrown into operation by the movement of the stop plunger into the depression on the stop cam.

28. A sewing machine, having, in combination, sewing mechanism, a work clamp, feed mechanism, a sewing shaft, driving connections between the sewing shaft and feed mechanism, a stop cam for the sewing shaft having a stopping depression, a stop plunger coöperating with the cam, a driver for the feed mechanism, a latch for holding the driver out of action, and a dog on the latch for connecting it with the stop plunger.

29. A sewing machine, having, in combination, sewing mechanism, a work clamp, feed mechanism, a sewing shaft, driving connections between the sewing shaft and feed mechanism, a stop cam for the sewing shaft having a stopping depression, a stop plunger coöperating with the cam, a driver for the feed mechanism, a latch for holding the driver out of action, a dog on the latch for connecting it with the stop plunger, and means for disconnecting the dog from the plunger upon the release of the driver.

30. A sewing machine, having, in combination, sewing mechanism, a work clamp, a feed cam shaft provided with cams for operating the clamp and relatively moving the clamp and sewing mechanism to sew about a buttonhole, a sewing shaft, driving connections between the sewing shaft and feed cam shaft, driving mechanism for driving the feed cam shaft when the sewing shaft is idle, driving mechanism for the sewing shaft, a stop cam on the sewing shaft, a stop plunger coöperating therewith, a cam on the feed cam shaft for controlling the movement of the stop plunger out of and into coöperative relation with the stop cam, means operated by the movement of the stop plunger out of stopping position for throwing out the cam shaft driving mechanism, and means operated by the movement of the stop plunger into stopping position for throwing in the cam shaft driving mechanism.

31. A sewing machine, having, in combination, sewing mechanism, a work clamp, a feed shaft provided with cams for operating the clamp and relatively moving the clamp and sewing mechanism to sew about a buttonhole, a sewing shaft, driving connections between the sewing shaft and feed cam shaft, driving mechanism for the feed cam shaft, a latch for holding said driving mechanism out of action, a manually operated trip for releasing said latch, driving mechanism for the sewing shaft, stop mechanism for the sewing shaft, a cam on the feed shaft for controlling the sewing shaft driving and stopping mechanism, connections between the stop mechanism and the feed shaft driving mechanism for throwing out said driving mechanism when the stop mechanism is thrown out and for releasing its latch when the stopping mechanism comes to stopping position, and a cam on the feed cam shaft for finally throwing out the feed cam shaft driving mechanism.

32. A sewing machine, having, in combination, sewing mechanism, a work clamp, feed mechanism for relatively moving the sewing mechanism and clamp to sew along the opposite sides and about the eye end of a buttonhole, a sewing shaft, driving connections between the sewing shaft and feed mechanism, driving and stopping mechanism for the sewing shaft, and a controlling cam for the driving and stopping mechanism moving with the feed mechanism arranged to start and stop the sewing on opposite sides of the buttonhole and the same distance from the eye end, and having provision for adjustment of its length to vary said distance and thereby the length of the buttonhole sewn.

33. A sewing machine, having, in combination, sewing mechanism, a work clamp, feed mechanism for relatively moving the sewing mechanism and clamp to sew along the sides and about the eye end of a buttonhole, a sewing shaft, driving connections between the sewing shaft and feed mechanism, driving and stopping mechanism, a sectional controlling cam for the driving and stopping mechanism moving with the feed mechanism arranged to start and stop the sewing on opposite sides of the buttonhole and at the same distance from the eye end, and having provision for adjustment of its sections equally to vary said distance.

34. A sewing machine, having in combination, sewing mechanism, a work clamp, a feed mechanism for relatively moving the sewing mechanism and clamp to sew along the sides and about the eye end of a buttonhole, driving and stopping mechanism, and a controlling cam for the driving and stopping mechanism arranged to start and stop the sewing on opposite sides of the buttonhole and at the same distance from the eye end comprising two segmental sections adjustable to expand or contract the cam equally at opposite ends.

35. A sewing machine, having, in combination, sewing mechanism, a work clamp, a feed cam shaft provided with a feed cam, two circumferentially adjustable cam rings on the shaft each provided with a cam segment, means for securing the rings in adjusted position, and driving and stopping mechanism controlled by the cam segment.

36. A sewing machine, having, in combination, sewing mechanism, a work clamp, a feed cam shaft provided with a feed cam, two cam rings mounted to turn on the shaft and each provided with a segmental cam section, locating devices on the rings, means for securing the rings in adjusted position on the shaft, and driving and stopping mechanism controlled by the cam sections.

37. A sewing machine, having, in combination, sewing mechanism, a work clamp, a feed cam shaft provided with a feed cam, two cam rings mounted to turn on the shaft and each provided with a segmental cam section, locating notches in the rings, a locking bolt for engaging the registering notches, and driving and stopping mechanism controlled by the cam sections.

38. A sewing machine, having, in combination, sewing mechanism, a work clamp, a feed cam shaft provided with a feed cam, two cam rings mounted to turn on the shaft and each provided with a segmental cam section, adjustable end pieces secured to the rings, means for securing the rings in adjusted position, and driving and stopping mechanism controlled by the cam sections.

39. A sewing machine, having, in combination, sewing mechanism, a work clamp, feed mechanism for relatively moving the sewing mechanisms and clamp to sew about the opposite sides and about the end of a buttonhole, a sewing shaft, connections between the feed mechanism and sewing shaft for continuously driving the feed mechanism during the sewing, and means for controlling the starting and stopping of the sewing shaft having provision for adjustment to sew buttonholes of different lengths.

40. A sewing machine, having, in combination, sewing mechanism, a work clamp, a buttonhole cutter, a cam shaft for operating the clamp and cutter and for effecting the feed, a sewing shaft geared to continuously rotate the cam shaft during the sewing, driving mechanism for the sewing shaft, mechanism for driving the cam shaft while the sewing shaft is idle, and means for rendering the driving mechanisms alternatively active, having provision for adjustments to sew buttonholes of different lengths.

41. A sewing machine, having, in combination, sewing mechanism, a work clamp, feeding mechanism for effecting a relative travel of the sewing mechanism and work clamp of uniform length, mechanism for actuating the feed mechanism to give a continuous relative travel during the sewing, mechanism for actuating the feed mechanism while the sewing mechanism is idle, and means for effecting inverse adjustment of the periods of action of said actuating mechanisms to vary the length of buttonholes sewn.

42. A sewing machine, having, in combination, sewing mechanism, a work clamp, feeding mechanism for giving the work clamp a uniform length of reciprocation, mechanism for actuating the feed mechanism to continuously feed the work clamp toward and from one end of its travel during the sewing, mechanism for actuating the feed mechanism to move the work clamp toward and from the other end of its travel while the sewing mechanism is idle, and means for effecting inverse adjustment of the periods of action of said actuating mechanisms to vary the length of the buttonholes sewn.

43. A sewing machine, having, in combination, sewing mechanism, a work clamp, feeding mechanism for giving the work clamp a uniform length of reciprocation, mechanism for actuating the feed mechanism to continuously feed the work toward and from one end of its travel during the sewing, mechanism for rotating the sewing mechanism to sew about the eye end of a button hole, mechanism for actuating the feed mechanism to move the work clamp toward and from its retracted position while the sewing mechanism is idle, means for effecting inverse adjustment of the periods of action of said actuating mechanisms to vary the length of the buttonholes, a cutter, and means for operating the cutter while the clamp is out of register with the sewing mechanism.

44. A sewing machine, having, in combination, sewing mechanism, a work clamp, feed mechanism for relatively moving the sewing mechanism and clamp to sew along the opposite sides and about the eye end of a buttonhole, a one-way clutch, the driven member of which is geared to the feed mechanism, a sewing shaft geared to continuously rotate the driving member of the clutch, and mechanism for driving the feed mechanism while the sewing shaft is idle.

45. A sewing machine, having, in combination, sewing mechanism, a work clamp, feed mechanism for relatively moving the sewing mechanism and clamp to sew along the opposite sides and about the eye end of a buttonhole, a sewing shaft geared to continuously drive the feed mechanism, driving and stopping mechanism for the sewing shaft, and means for controlling the driving and stopping mechanism having provision for adjustment to vary the length of the buttonholes sewn.

46. A sewing machine, having, in combination, sewing mechanism, a work clamp, a feed cam for relatively moving the sewing mechanism and clamp to sew about a buttonhole, a shaft for rotating the feed cam, a support mounted to swing about the axis of the shaft, a shaft mounted in the support, intermeshing gears on the shafts, a worm gear removably attached to the end of the shaft in the support, and a shaft for driving the sewing mechanism provided with a worm engaging the worm gear.

47. A sewing machine, having, in combination, sewing mechanism, a work clamp, a feed cam for relatively moving the sewing mechanism and clamp to sew about a buttonhole, a shaft for rotating the feed cam, a support mounted to swing about the axis of the shaft, a shaft mounted in the support, intermeshing gears on the shafts, a worm gear removably attached to the end of the latter shaft, a positioning plate for the worm gear, a shaft for driving the sewing mechanism provided with a worm, and means for securing the plate in position to engage the worm gear and worm.

48. A sewing machine, having, in combination, sewing mechanism, feed mechanism for relatively moving the sewing mechanism and work, a sewing shaft, a stop cam on the shaft, a spring pressed plunger for coöperating with the cam to retard and stop the shaft, means for moving the stop plunger into and out of coöperative relation with the stop cam, and mechanism for throwing out the sewing shaft driving mechanism operated through the movement of the plunger by the stop cam.

49. A sewing machine, having, in combination, sewing mechanism, feed mechanism for relatively moving the sewing mechanism and work, a sewing shaft, a driver for the sewing shaft, a stop cam on the shaft, a spring pressed plunger for coöperating with the cam to retard and stop the shaft, means for moving the stop plunger into and out of coöperative relation with the stop cam, and mechanism for throwing in the sewing shaft driver through the movement of the plunger out of operative relation to the cam, and for throwing it out through the movement of the plunger by the cam.

50. A sewing machine, having, in combination, a sewing shaft, a stop cam on the shaft, a spring pressed plunger for coöperating with the cam to retard and stop the shaft, means for moving the plunger out of and into coöperative relation with the stop cam, and mechanism for throwing out the sewing shaft driving mechanism operated through the movement of the plunger by the stop cam.

51. A sewing machine, having, in combination, sewing mechanism, feed mechanism for relatively moving the work and sewing mechanism, a sewing shaft, a stop cam on the shaft, a spring pressed plunger for coöperating with the shaft to retard and stop the shaft, means moving in time with the feed mechanism for controlling the movement of the plunger into coöperative relation with the cam, and mechanism for throwing out the sewing shaft driving mechanism operated through the movement of the plunger by the stop cam.

52. A sewing machine, having, in combination, sewing mechanism, feed mechanism for relatively moving the sewing mechanism and work, a sewing shaft for actuating the sewing and feed mechanisms, a driver for the shaft, an actuator for throwing the driver in and out, a stop cam on the shaft, a spring pressed plunger for coöperating with the cam to retard and stop the shaft, connections for operating the actuator to throw the driver out through the movement of the plunger by the cam, and a latch for holding the actuator arranged to be disengaged through the movement of the plunger out of operative relation to the cam.

53. A sewing machine, having, in combination, sewing mechanism, a work clamp, feed mechanism for relatively moving the sewing mechanism and clamp to sew about a buttonhole, a sewing shaft, mechanism for driving the feed mechanism from the sewing shaft having provision for varying the relative speed of the feed mechanism, a stop cam on the sewing shaft, a spring pressed plunger for coöperating with the cam to retard and stop the shaft, means for moving the plunger into and out of coöperative relation to the stop cam, and mechanism for throwing out the sewing shaft driving mechanism operated through the movement of the plunger by the stop cam.

GEORGE S. HILL.